US012541297B2

(12) United States Patent
Rodriguez et al.

(10) Patent No.: US 12,541,297 B2
(45) Date of Patent: Feb. 3, 2026

(54) DYNAMIC ADJUSTMENT OF PLANOGRAMS ON ELECTRONIC DOOR DISPLAYS OF REFRIGERATED DISPLAY CASES

(71) Applicant: Anthony, Inc., Sylmar, CA (US)

(72) Inventors: Adrian Rodriguez, Santa Clarita, CA (US); Pedro Almaguer, North Hills, CA (US); Francisco Flores, Valencia, CA (US)

(73) Assignee: Anthony, Inc., Sylmar, CA (US)

( * ) Notice: Subject to any disclaimer, the term of this patent is extended or adjusted under 35 U.S.C. 154(b) by 0 days.

(21) Appl. No.: 18/748,669

(22) Filed: Jun. 20, 2024

(65) Prior Publication Data

US 2025/0390210 A1 Dec. 25, 2025

(51) Int. Cl.
| | |
|---|---|
| *G06F 3/0488* | (2022.01) |
| *A47F 3/04* | (2006.01) |
| *F25D 23/02* | (2006.01) |
| *G03H 1/00* | (2006.01) |
| *G06F 3/0482* | (2013.01) |
| *G06F 3/14* | (2006.01) |

(Continued)

(52) U.S. Cl.
CPC .......... *G06F 3/0488* (2013.01); *A47F 3/0434* (2013.01); *F25D 23/021* (2013.01);
(Continued)

(58) Field of Classification Search
CPC ...... G06F 3/041–047; G06F 2203/041–04114; G06F 3/0412;
(Continued)

(56) References Cited

U.S. PATENT DOCUMENTS 11,768,030 B2  9/2023 Avakin et al.
2012/0223935 A1* 9/2012 Renwick .............. G06F 3/0488
345/419

(Continued)

FOREIGN PATENT DOCUMENTS

CN 106933465 B * 1/2021 ............. G06F 21/32

OTHER PUBLICATIONS

Chen et al., "Investigation of the Autostereoscopic Displays Based on Various Display Technologies," Nanomaterials, Jan. 2022, 12(429):1-16.

(Continued)

*Primary Examiner* — Sanjiv D. Patel
(74) *Attorney, Agent, or Firm* — Fish & Richardson P.C.

(57) ABSTRACT

Methods and systems are disclosed for dynamic adjustment of planograms on electronic door displays of refrigerated display cases. A display system for a refrigerated display case includes: a movable door configured to provide access to the refrigerated display case; a touchscreen display mounted to the door; at least one processor in electronic communication with the touchscreen display and configured to perform operations comprising: providing, for presentation by the touchscreen display, first image data, wherein the first image data depicts one or more products stored within the refrigerated display case; detecting user input at a first location of the touchscreen display, wherein the user input includes a selection of a product stored within the refrigerated display case; and in response to detecting the user input, providing second image data for presentation in addition to the first image data, wherein the second image data depicts information related to the selected product.

21 Claims, 15 Drawing Sheets

(51) Int. Cl.
*G06Q 30/0601* (2023.01)
*H04N 13/383* (2018.01)
*G03H 1/22* (2006.01)

(52) U.S. Cl.
CPC ......... *G03H 1/0005* (2013.01); *G06F 3/0482* (2013.01); *G06F 3/1454* (2013.01); *G06Q 30/0623* (2013.01); *H04N 13/383* (2018.05); *F25D 2400/361* (2013.01); *G03H 1/2294* (2013.01)

(58) Field of Classification Search
CPC .. G06F 3/0488; G06F 3/04886; G06F 1/3231; G06F 3/147; F25D 2400/361; G07F 9/002; G07F 9/023; G07F 9/009; G07F 11/62; G07F 11/00; G07F 17/10; G07F 17/3211; G09F 2023/0033; G09G 2380/04; G09G 2380/06; G09G 2358/00; G02F 1/1323
See application file for complete search history.

(56) References Cited

U.S. PATENT DOCUMENTS

| | | | |
|---|---|---|---|
| 2014/0240293 A1* | 8/2014 | McCaughan | G06F 3/0426 345/175 |
| 2016/0098692 A1* | 4/2016 | Johnson | G06Q 20/389 705/43 |
| 2017/0264851 A1* | 9/2017 | Kuplevakhsky | H04N 21/44218 |
| 2020/0134291 A1* | 4/2020 | Kim | G06V 20/64 |
| 2020/0135137 A1* | 4/2020 | Kim | G09G 3/3696 |
| 2021/0297653 A1 | 9/2021 | Huang et al. | |

OTHER PUBLICATIONS

Wu et al., "Temporal Psychovisual Modulation: A New Paradigm of Information Display," IEEE Signal Processing Magazine, Jan. 2013, 30(1):136-141.

* cited by examiner

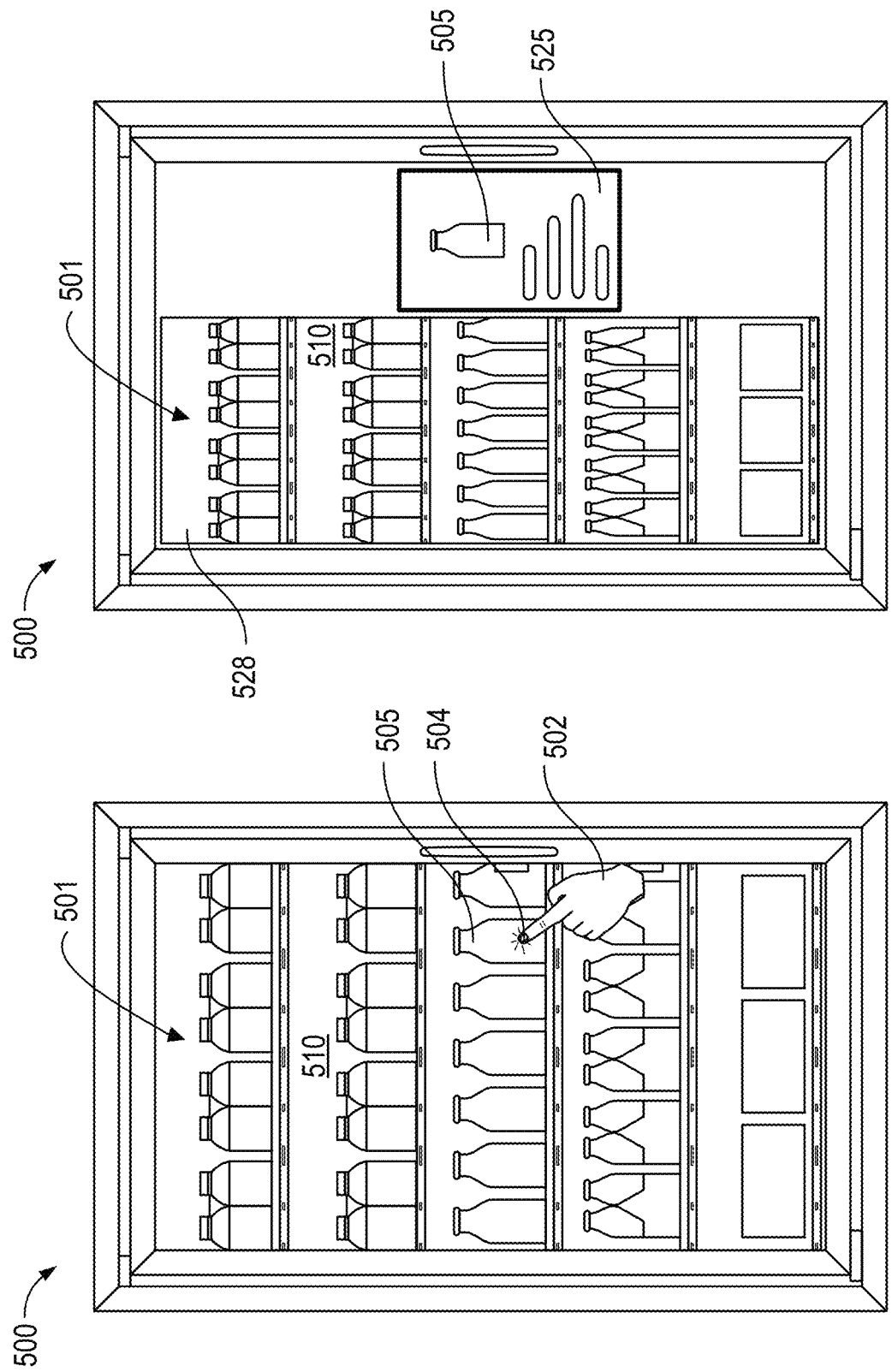

DYNAMIC ADJUSTMENT OF PLANOGRAMS ON ELECTRONIC DOOR DISPLAYS OF REFRIGERATED DISPLAY CASES

TECHNICAL FIELD

This invention relates to thermally insulated doors for temperature-controlled display cases.

BACKGROUND

Refrigerated display cases are used in commercial, institutional, and residential applications for storing and/or displaying refrigerated or frozen objects. Refrigerated display cases may be maintained at temperatures above freezing (e.g., a refrigerator) or at temperatures below freezing (e.g., a freezer). Refrigerated display cases have one or more thermally insulated doors or windows for viewing and accessing refrigerated or frozen objects within a temperature-controlled space. Doors for refrigerated display cases generally include thermally insulated glass panel assemblies. Displaying content on refrigerated display case doors can be an effective way of advertising products.

SUMMARY

The present disclosure relates to dynamic adjustment of planograms on an electronic door display of a refrigerated display case. The electronic display can present a planogram depicting products stored within the display case. The planogram can be dynamically adjusted in response to detecting user interaction with the display case. Dynamic adjustment of planograms can permit one customer to view a planogram showing products behind an opaque door display while permitting another customer to simultaneously interact with and manipulate the content displayed on the door display.

Implementations of the present disclosure include a display system for a refrigerated display case, including: a movable door configured to provide access to the refrigerated display case; a touchscreen display mounted to the door; at least one processor in electronic communication with the touchscreen display; and a data store coupled to the at least one processor having instructions stored thereon which, when executed by the at least one processor, causes the at least one processor to perform operations including: providing, for presentation by the touchscreen display, first image data. The first image data depicts one or more products stored within the refrigerated display case. The operations include detecting user input at a first location of the touchscreen display. The user input includes a selection of a product stored within the refrigerated display case. The operations include, in response to detecting the user input, providing second image data for presentation in addition to the first image data. The second image data depicts information related to the selected product.

In some implementations, the operations include providing the second image data for presentation by the touchscreen display.

In some implementations, the operations include: in response to detecting the user input: providing the second image data for presentation by the touchscreen display in a first area of the touchscreen display that includes the first location; and providing the first image data for presentation by the touchscreen display in a second area of the touchscreen display that excludes the first location.

In some implementations, providing the first image data for presentation by the touchscreen display in the second area of the touchscreen display that excludes the first area includes reducing a display size of the first image data.

In some implementations, the operations include, in response to detecting the user input: providing the second image data for presentation by a second, different display in communication with the at least one processor.

In some implementations, the operations include, in response to detecting the user input: providing the second image data for presentation by the touchscreen display; and providing the first image data for presentation by a second, different display in communication with the at least one processor.

In some implementations, the touchscreen display includes a holographic projector, the operations including providing the second image data for presentation by the holographic projector.

In some implementations, the operations include: detecting an electromagnetic signal from a mobile device; and in response to detecting the electromagnetic signal from the mobile device, providing the second image data for presentation by a display of the mobile device.

In some implementations, the touchscreen display includes an autostereoscopic display configured to present multiple different images at respective multiple different viewing angles.

In some implementations, the operations include: in response to detecting the user input, determining a viewing angle of the user.

In some implementations, the operations include: providing the second image data for presentation by the touchscreen display. The second image data is visible at the viewing angle of the user; and providing the first image data for presentation by the touchscreen display. The first image data is not visible at the viewing angle of the user.

In some implementations, the operations include: providing the second image data for presentation by the touchscreen display. The second image data is visible within a cone of viewing angles relative to the touchscreen display, the cone of viewing angles including the viewing angle of the user; and the second image data is not visible outside of the cone of viewing angles.

In some implementations, the operations include: determining the viewing angle of the user based on the first location of the touchscreen display at which the user input was detected.

In some implementations, the display system includes a sensor configured to generate sensor data indicating a user location, the operations including: obtaining sensor data generated by the sensor; and determining the viewing angle of the user based on the sensor data.

In some implementations, the sensor includes at least one of a camera, an infrared sensor, a radar sensor, an ultrasonic sensor, and a motion sensor.

In some implementations, the operations include: detecting a second user input at a second location of the touchscreen display. The second user input includes a selection of a second product stored within the refrigerated display case; and in response to detecting the second user input, providing third image data for presentation in addition to the first image data and the second image data. The third image data depicts information related to the second product.

In some implementations, the operations include: in response to detecting the second user input: providing the third image data for presentation by the touchscreen display in a second area of the touchscreen display that includes the second location; and providing the first image data for presentation by the touchscreen display in a third area of the touchscreen display that excludes the first location and the second location.

In some implementations, an internal volume of the refrigerated display case holds an inventory including the one or more products; and the first image data includes a planogram representing the inventory.

In some implementations, the movable door includes an insulated panel.

Further implementations of the present disclosure include a refrigerated display case system, including: a refrigerated display case including an internal volume; and a display system including: a movable door configured to provide access to the internal volume of the refrigerated display case; a touchscreen display mounted to the door; at least one processor in electronic communication with the touchscreen display; and a data store coupled to the at least one processor having instructions stored thereon which, when executed by the at least one processor, causes the at least one processor to perform operations including: providing, for presentation by the touchscreen display, first image data. The first image data depicts one or more products stored within the internal volume of the refrigerated display case; detecting user input at a first location of the touchscreen display. The user input includes a selection of a product stored within the internal volume of the refrigerated display case. The operations include, in response to detecting the user input, providing second image data for presentation in addition to the first image data. The second image data depicts information related to the selected product.

Further implementations of the present disclosure include a computer-implemented method of operating a display system for a refrigerated display case, the display system including a movable door configured to provide access to the refrigerated display case, the method including: providing, for presentation by a touchscreen display mounted to the movable door, first image data. The first image data depicts one or more products stored within the refrigerated display case; detecting user input at a first location of the touchscreen display. The user input includes a selection of a product stored within the refrigerated display case. The operations include, in response to detecting the user input, providing second image data for presentation in addition to the first image data. The second image data depicts information related to the selected product.

Particular implementations of the subject matter described in this specification can be implemented so as to realize one or more of the following advantages.

By dynamically adjusting planograms in response to receiving touch input, information about selected products can be presented to a customer interacting with the touchscreen while reducing impact to customer experience of other customers. For example, a customer can view information about a particular product on part of the touchscreen, while other customers can view depictions of other products that are available inside the refrigerated display case. In some cases, a customer viewing a display from one angle can view information about a particular product, while other customers viewing the display from different angles can view depictions of other products that are available inside the refrigerated display case. In some examples, a customer can view information about a particular product on an adjacent, connected display, while other customers can view, on the display door, depictions of other products that are available inside the refrigerated display case. In some examples, a customer can select a product on the touchscreen and then view the product information on their personal device. Another customer can then interact with the touchscreen and view product information on the touchscreen or on their personal device, without the customers interfering with each other. Thus, implementations of the present disclosure enable multiple customers to view and interact with a touchscreen display door, without interfering with each other. This can decrease wait time for a customer, because the customer does not need to wait for the previous customer to end their interaction before being able to view and select products inside a display case. Implementations of the present disclosure enable customers to view both general information about the various products within the display case, and detailed information about specific products, prior to opening a door of a refrigerated display case. This can reduce energy consumption of retail establishments, because customers are more likely to decide which product to purchase before opening the door of the refrigerated display case.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5C and 5D show an example display system dynamically resizing planograms in response to receiving a touch input according to implementations of the present disclosure.

Like reference numbers and designations in the various drawings indicate like elements.

DETAILED DESCRIPTION

Figure 1:
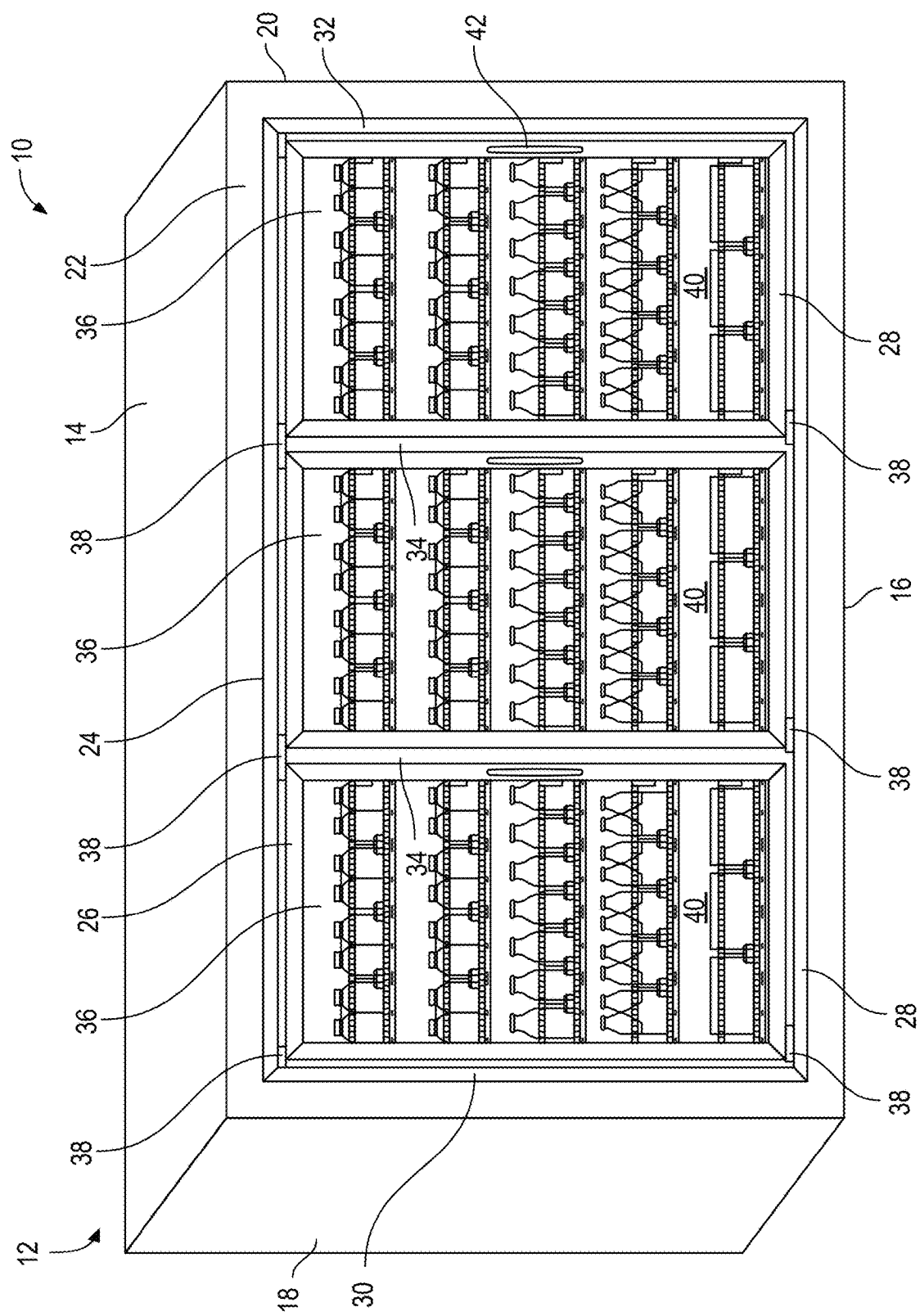
FIGS. 1 and 2 show an exemplary refrigerated display case according to some implementations of the present disclosure.
Figure 2:
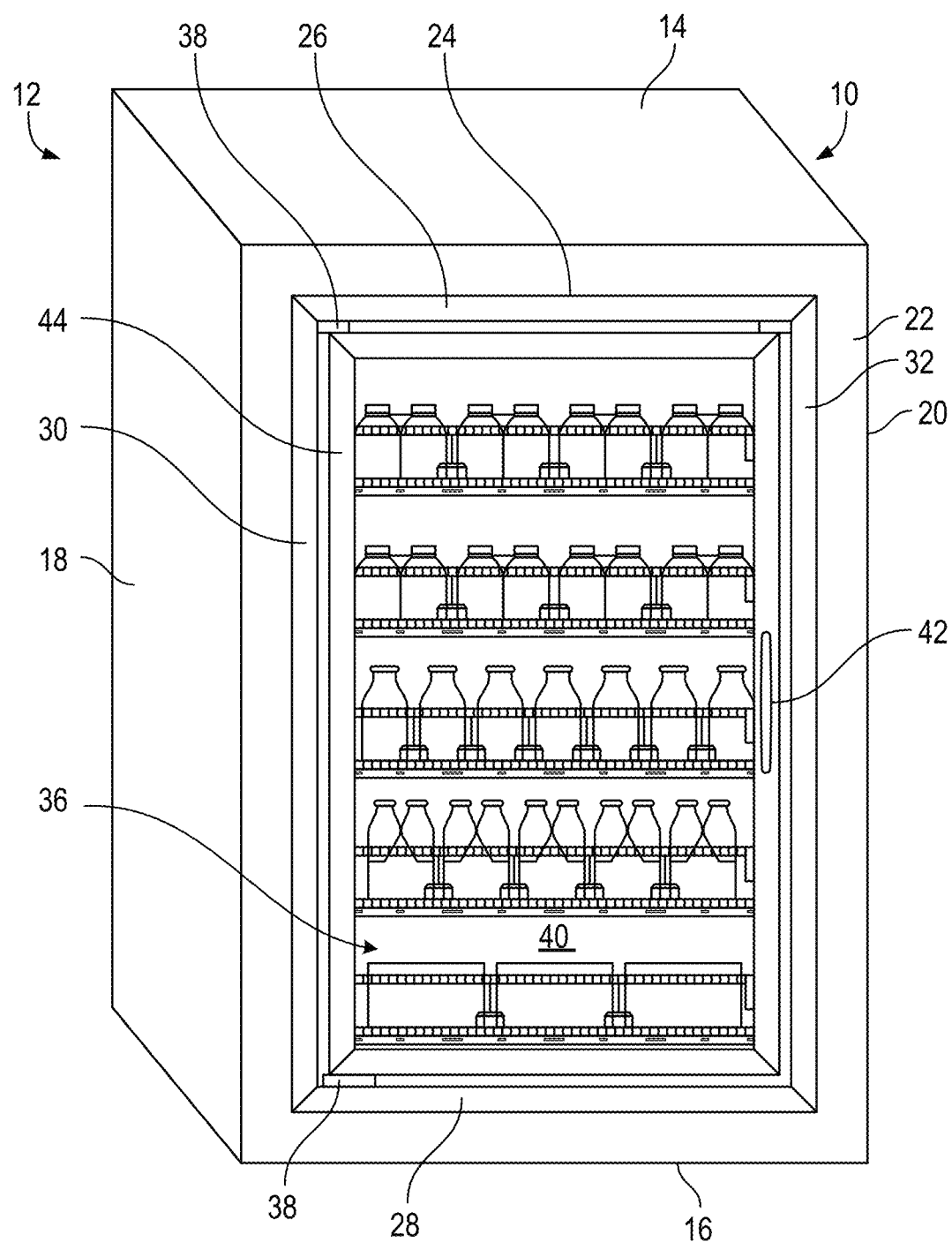

FIGS. 1 and 2 show an exemplary refrigerated display case system 10. The refrigerated display case system 10 can be a refrigerator, freezer, or other enclosure defining a temperature-controlled space. In some implementations, refrigerated display case system 10 is a refrigerated display case. For example, refrigerated display case system 10 can be a refrigerated merchandiser in retail establishments such as grocery stores, supermarkets, convenience stores, florist shops, and/or other commercial settings to store and display temperature-sensitive consumer goods (e.g., food products and the like). The refrigerated display case system 10 can be used to display products that must be stored at relatively low temperatures and can include shelves, glass doors, glass walls, and/or video displays to permit viewing of the products supported by the shelves. In some implementations, refrigerated display case system 10 is a refrigerated storage unit used, for example, in warehouses, restaurants, and lounges. Refrigerated display case system 10 can be a free standing unit or "built in" unit that forms a part of the building in which refrigerated display case system 10 is located.

The refrigerated display case system 10 includes a container 12. Container 12 includes a top wall 14, a bottom wall 16, a left side wall 18, a right side wall 20, a rear wall (not shown), and a front portion 22 defining a temperature-controlled space. The container 12 encloses an internal volume of the refrigerated display case. The internal volume of the container 12 is configured to hold an inventory of products.

Front portion 22 includes an opening into the temperature-controlled space. A thermal frame 24 can be mounted at least partially within the opening. The thermal frame 24 includes a plurality of perimeter frame segments (i.e., a header or top frame segment 26, a sill or bottom frame segment 28, a left side frame segment 30, and a right side frame segment 32) forming a closed shape along a perimeter of the opening. In some implementations, the thermal frame 24 includes one or more mullion frame segments 34 dividing the opening into multiple smaller openings. For example, FIG. 1 illustrates a three-door assembly with a pair of mullion frame segments 34 extending between top frame segment 26 and bottom frame segment 28 to divide the opening into three smaller openings. Each of the smaller openings may correspond to a separate display case door 100 of the three-door assembly. In other implementations, mullion frame segments 34 may be omitted. For example, FIG. 2 illustrates a one-door assembly in which thermal frame 24 includes perimeter frame segments 26-32 but not mullion frame segments 34. In some implementations, thermal frame 24 includes include top frame segment 26 and bottom frame segment 28 with no side frame segments 30 or 32. In such implementations, thermal frame 24 may include one or more mullion frame segments (e.g., such as mullion frame segment 34 shown in FIG. 1) depending, for example, on the size of the refrigerated enclosure in which thermal frame 24 is to be installed and the number of doors.

Refrigerated display case system 10 includes one or more movable doors. The movable doors are configured to provide access to the internal volume of the refrigerated display case system 10. In some examples, display case doors 100 are pivotally mounted on the thermal frame 24 by hinges 38. In some implementations, the display case doors 100 are sliding doors configured to open and close by sliding relative to the thermal frame 24. The example display case doors 100 illustrated in FIGS. 1 and 2 include panel assemblies 40 and handles 42. Referring to FIG. 2, thermal frame 24 includes a series of contact plates 44. Contact plates 44 are attached to a front surface of thermal frame 24 and provide a sealing surface against which display case doors 100 rest in the closed position. For example, doors 100 may include a gasket or other sealing feature around a perimeter of each display case door 100. The gaskets may employ a flexible bellows and magnet arrangement, which, when the display case doors 100 are closed, engage contact plates 44 to provide a seal between doors 100 and thermal frame 24. The thermal frames provide a thermally conductive path from the frame segments 26-32, for maintaining the temperature of the contact plates 44 at or close to the temperature of the external environment (e.g., the environment outside of the refrigerated display case system 10) and to aid in preventing condensation from forming on the contact plates 44. Preventing condensation on the contact plates may provide for a more positive seal between the contact plates 44 and a magnetic gasket on the door, thereby improving the thermal properties of the refrigerated display case system 10.

Figure 3:
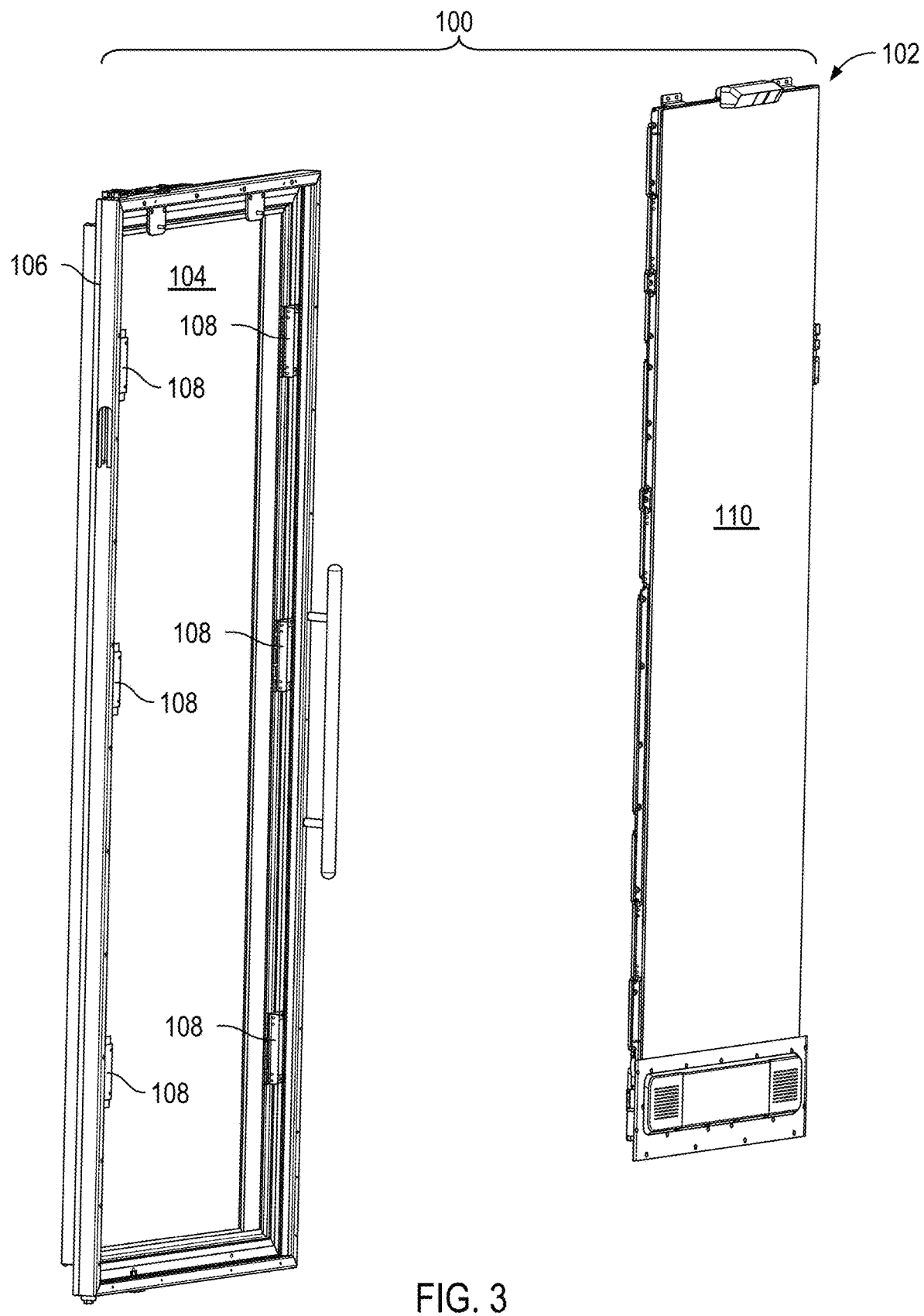
FIG. 3 shows an exploded perspective view of an exemplary arrangement of an electronic display assembly in a display case door according to implementations of the present disclosure.
Figure 4:
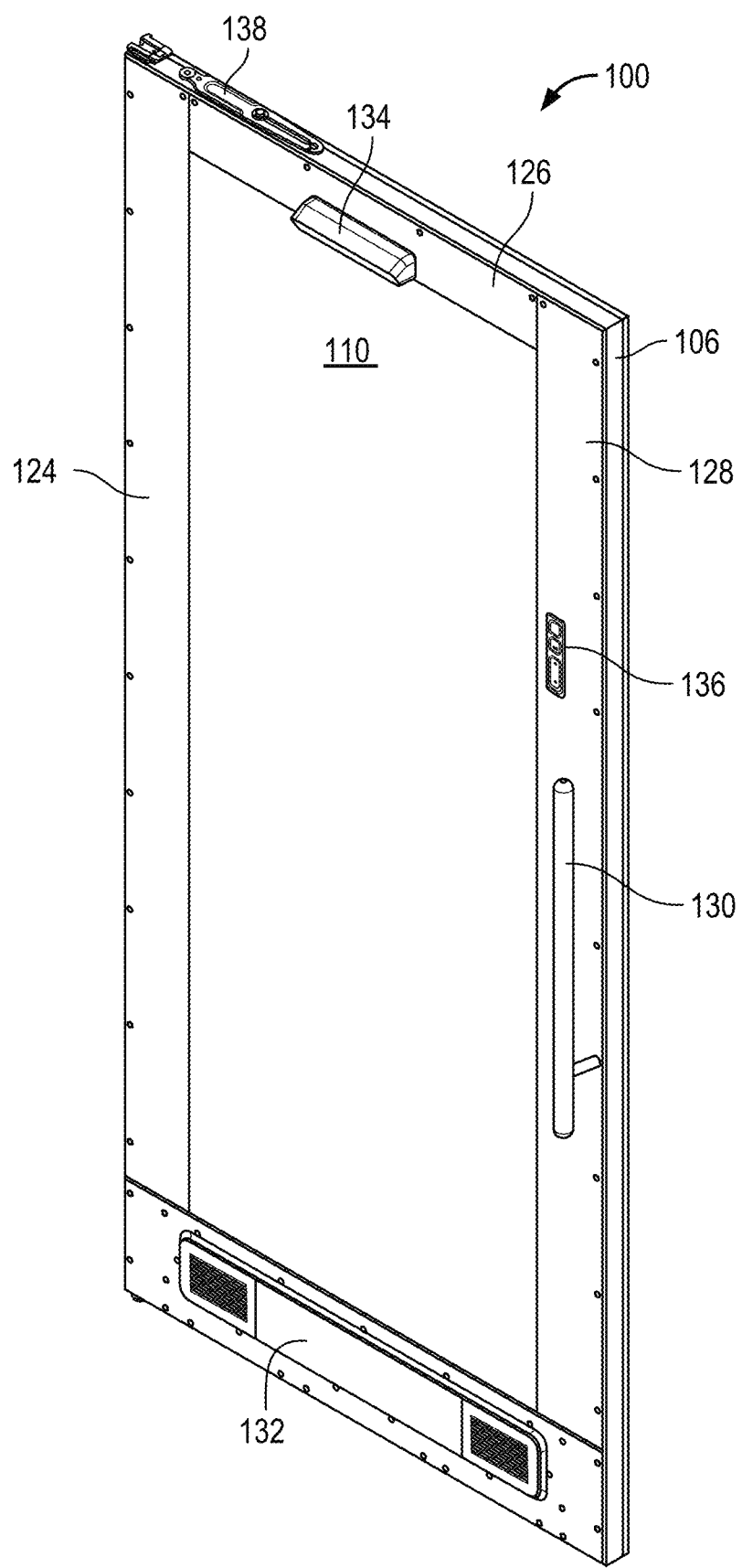
FIG. 4 shows a perspective view of an exemplary electronic display case door with the electronic display assembly mounted in door frame with bezels installed according to implementations of the present disclosure.

FIG. 3 is an exploded perspective view of an exemplary arrangement of an electronic display assembly 102 in a display case door 100 according to implementations of the present disclosure. FIG. 4 illustrates an exemplary display case door 100 that can be installed in a refrigerated display case such as a refrigerator, a freezer, or other enclosure defining a temperature-controlled space. Display case door 100 includes an insulated panel assembly 104 or transparent panel, a door frame 106 secured to an edge of insulated panel assembly 104, and mounting blocks 108. Mounting blocks are coupled to door frame 106.

The display case door 100 include an electronic display assembly 102 that is coupled to door frame 106 by way of mounting blocks 108. Electronic display assembly 102 can be mounted to door frame 106 so as to overlay all or a majority of insulated panel assembly 104. Electronic display assembly 102 includes electronic display 110. The electronic display assembly 102 can be mounted in front of an insulated panel assembly (e.g., a glass insulated panel assembly or an opaque foam panel assembly) in a door frame secured to an edge of the insulated panel assembly.

The electronic display 110 can be a touchscreen display. A touchscreen display includes a touch-sensitive surface to detect user input through a touch. A touchscreen display uses sensors (e.g., capacitive touch sensors, optical sensors, resistive sensors) to detect touch input. In some examples, touchscreen panels are overlaid on top of display plates to enable both touch screen and display functionalities.

The electronic display assembly 102 can include, e.g., a video display in electronic communication with control circuitry configured to display video and/or images including, but not limited to, images of products contained in a display case, advertisements, and nutritional information. In some examples, the electronic display is configured to present a planogram representing inventory held within the internal volume of the refrigerated display case. A planogram is a visual representation of the placement of retail products displayed for sale. For example, a planogram can depict the placement of merchandise on shelves within the refrigerated display case.

In some implementations, a display case door includes one or more bezels. The bezels can cover all or a portion of the mounting blocks and other components for mounting the electronic display assembly 102 to the movable door. The bezels can create a recognized UL wireway.

Insulated panel assembly 104 can include one or more panes of glass. In some implementations, insulated panel assembly 104 includes two or more layers of transparent panes bounding a sealed space in between, forming a sealed glass unit (SGU). Door frame 106 extends around and is secured to a peripheral edge of insulated panel assembly 104. As further described in detail below, door frame 106 defines a channel or tunnel that receives one or more power cables that provide electrical power to the electronic display assembly. In some implementations, insulated panel assembly 104 can be opaque. For example, insulated panel assembly can include a foam panel, e.g., formed by spray foam formed to an interior shape of the door frame.

Display case door 100 can include a single electronic display or multiple electronic displays. For example, display case door 100 can include two or more electronic displays vertically stacked and together covering the insulated panel assembly 104.

Electronic display 110 can include, but is not limited to, a liquid crystal display (LCD), a light emitting diode (LED) display, an organic light emitting diode (OLED) display, a field emission display (FED), a plasma display panel (PDP), or an electroluminescent (EL) display. For example, electronic display 110 can be a smart television with streaming capabilities for receiving content over a wireless network (e.g., a Wi-Fi network). Electronic display 110 is generally opaque and, when mounted to the movable display case door 100 partially or completely obstructs the view through the insulated panel assembly 104. In some implementations, electronic display 110 can be a custom sized display configured to correspond with dimensions of the display case door 100. In some implementations, electronic display 110 can be a commercial off the shelf (COTS) display.

In some implementations, electronic display 110 is a touchscreen display. A touchscreen display is an electronic display screen that is also an input device. A user interacts with the display screen by using hand gestures and fingertip movements to tap pictures, move elements, and type words on the screen. Touchscreens can be pressure-sensitive and/or contact sensitive. Touchscreens can be used or manipulated using, for example, fingers or a stylus.

FIG. 4 is a perspective view of the electronic display case door 100 of FIG. 3 with electronic display assembly 102 mounted in door frame 106, with bezels installed around the edges of door frame 106. Display case door 100 includes left bezel 124, top bezel 126, and right bezel 128. Each of left bezel 124, top bezel 126, and right bezel 128 overlay and conceal a portion of mounting blocks 108, left side hinge brackets 112, right side brackets 114, hangers 116, and display supports 118.

Display case door 100 includes handle 130. Electronic display assembly 102 includes circuitry module 132, top sensor 134, and handle-side sensor 136. The outside edges of circuitry module 132 are secured to left rail 206 and right rail 208 of door frame 106. Left bezel 124 and right bezel 128 can be attached to their respective rails. Top sensor 134 passes through an opening or cutout in top bezel 126. Handle-side sensor 136 is accessible through a corresponding aperture in right bezel 128.

The sensors 134, 136 can include, but are not limited to, a contact sensor (e.g., contact switch), a movement sensor (e.g., accelerometer, gyroscope, rheostat), a proximity sensor (e.g., optical sensor, infrared sensor, ultrasonic sensor, capacitive sensor, inductive sensor, magnetic sensor), or any combination thereof. In some examples, the sensors 134, 136 include multiple different types of sensors integrated into a single device.

Although top sensor 134 is shown as being located at a top of the door 100, and handle-side sensor 136 is shown as being located at a side of the door 100, the sensors 134, 136 can be located at other locations. For example, the sensors 134, 136 can be attached at another position of the door such a bottom corner or at an edge of the door 100 away from a corner, or coupled to the hinge 38. In some examples, the sensors 134, 136 are attached to a surface of the door 100. In some examples, the sensors 134, 136 are attached to a container (e.g., container 12 of the display case system 10). In some examples, the refrigerated display case system includes multiple sensors. The multiple sensors can be co-located or can be located in multiple different locations of the refrigerated display case system.

In some implementations, the sensors 134, 136 can detect conditions including, but not limited to, light levels, temperature, and humidity levels. The sensors 134, 136 can be configured to share data with media players and/or personal computers through a universal serial bus (USB) connection. In some implementations, the sensors 134, 136 are attached to a device that has a wireless Internet connection (i.e., "Wi Fi enabled" device), and can send signals to remote computing devices using the wireless Internet connection.

Hold open bracket 138 is provided on a top edge of display case door 100. One end of hold open bracket 138 is pivotally coupled to door frame 106. In service, hold open bracket 138 can be used to maintain door in a desired open position.

Circuitry module 132 can be positioned in the door 100 itself. For example, circuitry module 132 can be positioned in a bottom portion of door frame 106. Circuitry module 132 overlays a portion of insulated panel assembly 104. Circuitry module 132 can be attached to electronic display 110 such that, with electronic display 110 releasably coupled to door frame 106, circuitry module 132 is releasably coupled to door frame 106. Circuitry module 132 can include a processor configured to perform operations including providing information for presentation on the display 110. Circuitry module 132 can include a media player in electronic communication with electronic display 110 to control media content presented on electronic display 110.

In various implementations, door frame 106 has a width and thickness that allows display case door 100 to be installed and operated in an existing refrigerated display case without the need of retrofitting the display case. Display case door 100 can be operated with or without electronic display 110.

Figure 5B:
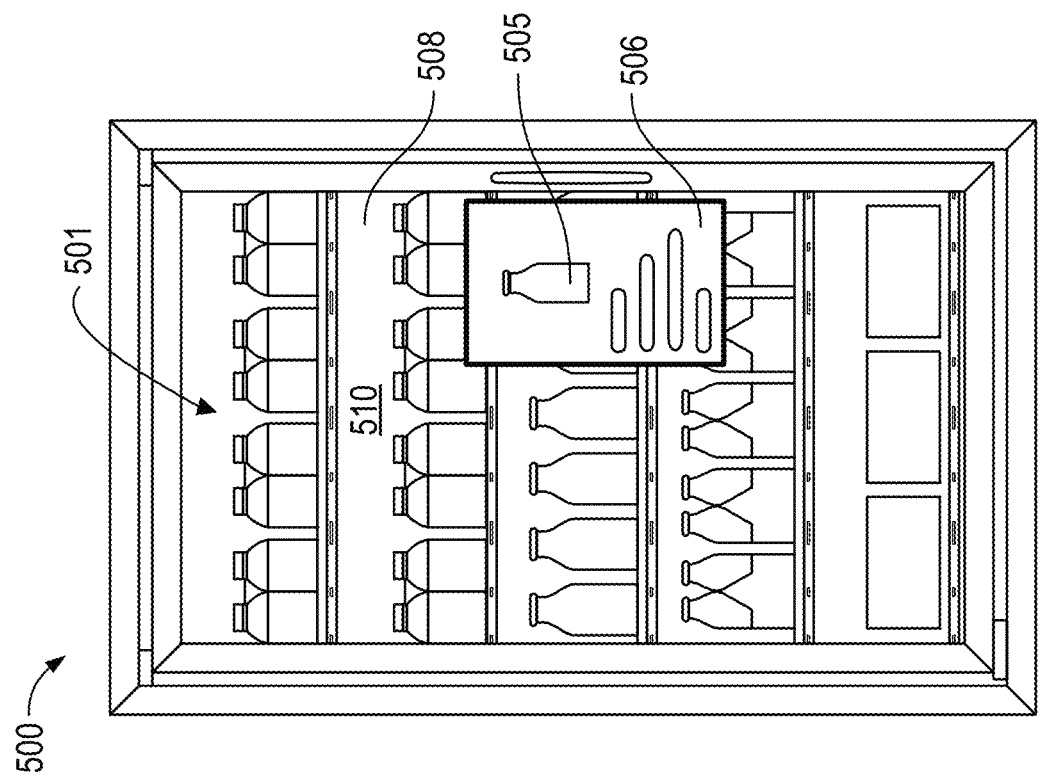
FIGS. 5A and 5B show an example display system dynamically adjusting planograms in response to receiving a touch input according to implementations of the present disclosure.
Figure 5A:
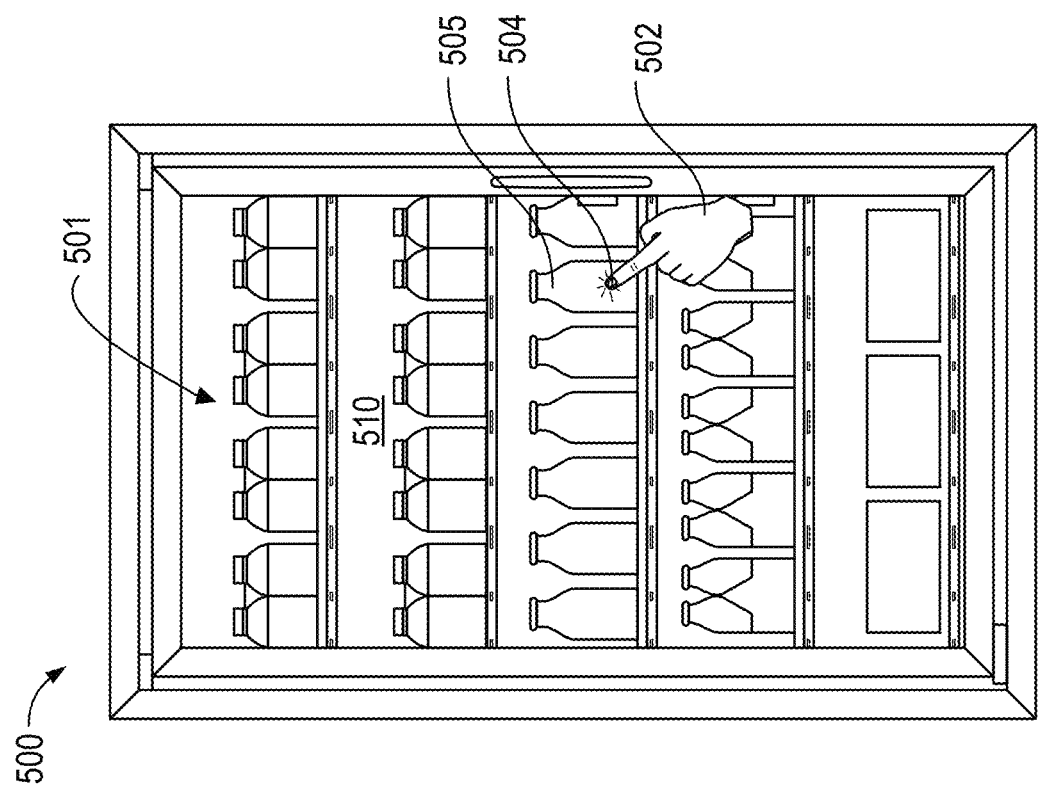
Figure 5F:
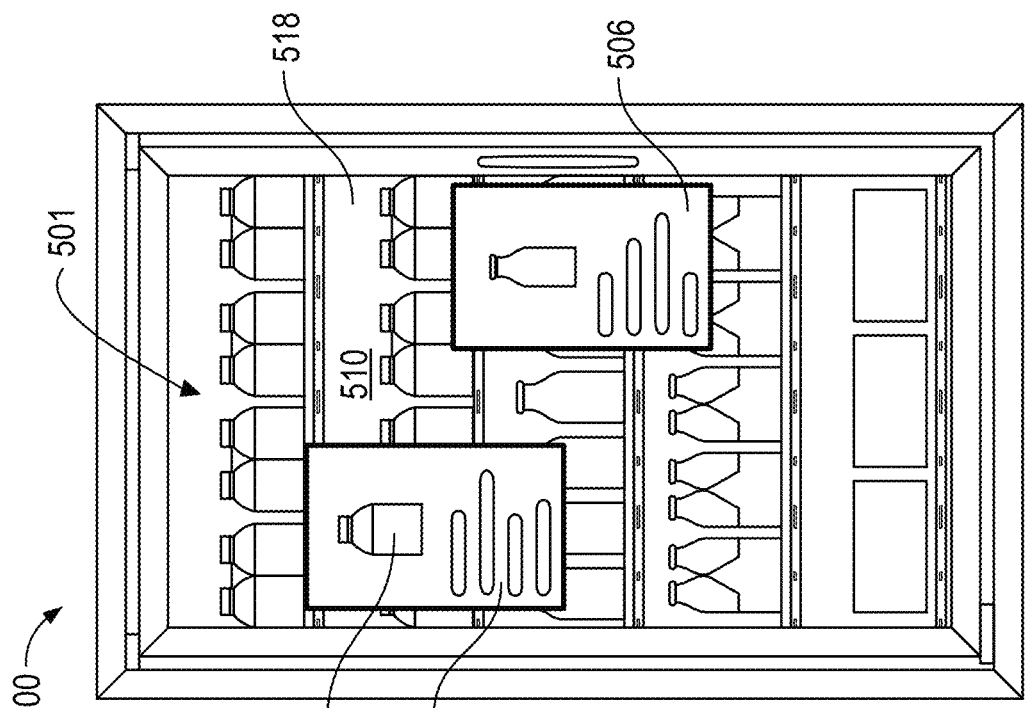
FIGS. 5E and 5F show an example display system dynamically adjusting planograms in response to receiving multiple touch inputs according to implementations of the present disclosure.
Figure 5E:
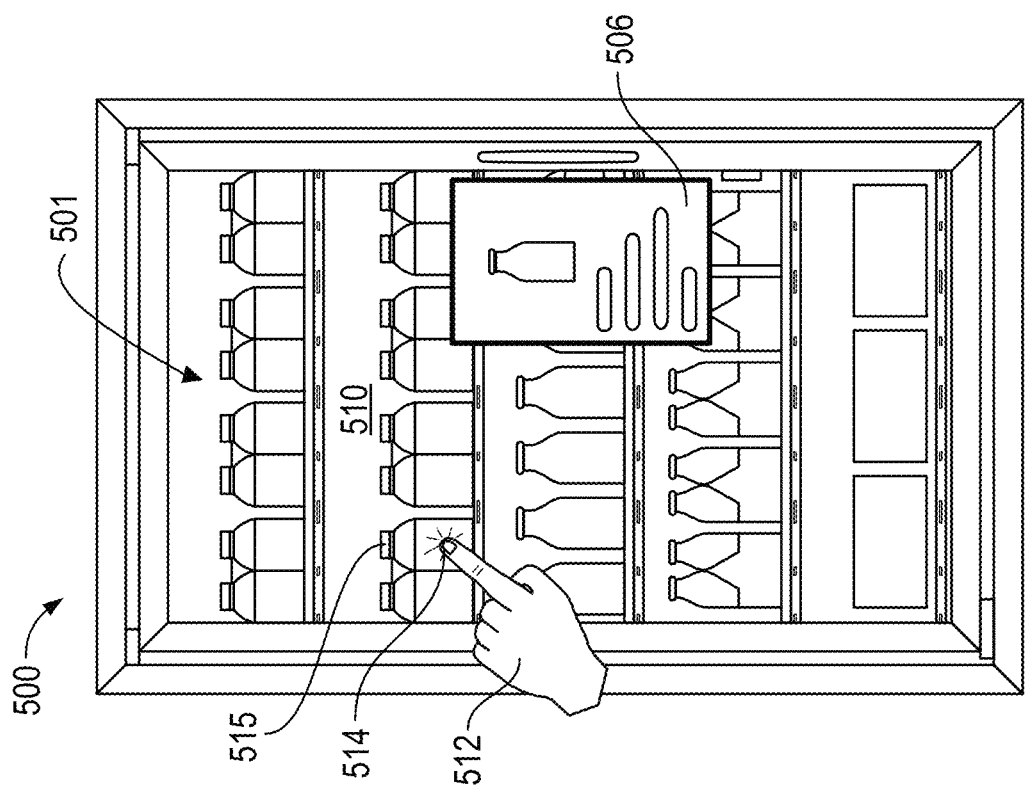

FIGS. 5A and 5B show an example display system 500 for a refrigerated display case receiving a touch input according to implementations of the present disclosure. FIGS. 5C and 5D show an example display system dynamically resizing planograms in response to receiving a touch input according to implementations of the present disclosure. FIGS. 5E and 5F show the example display system 500 receiving multiple touch inputs according to implementations of the present disclosure. The display system 500 can include a processor or processors in electronic communication with a touchscreen display 510. In some examples, a data store is coupled to the processor. The data store can store instructions that, when executed by the processor, cause the processor to perform operations, such as the operations described with respect to the flow chart of FIG. 6.

Figure 6:
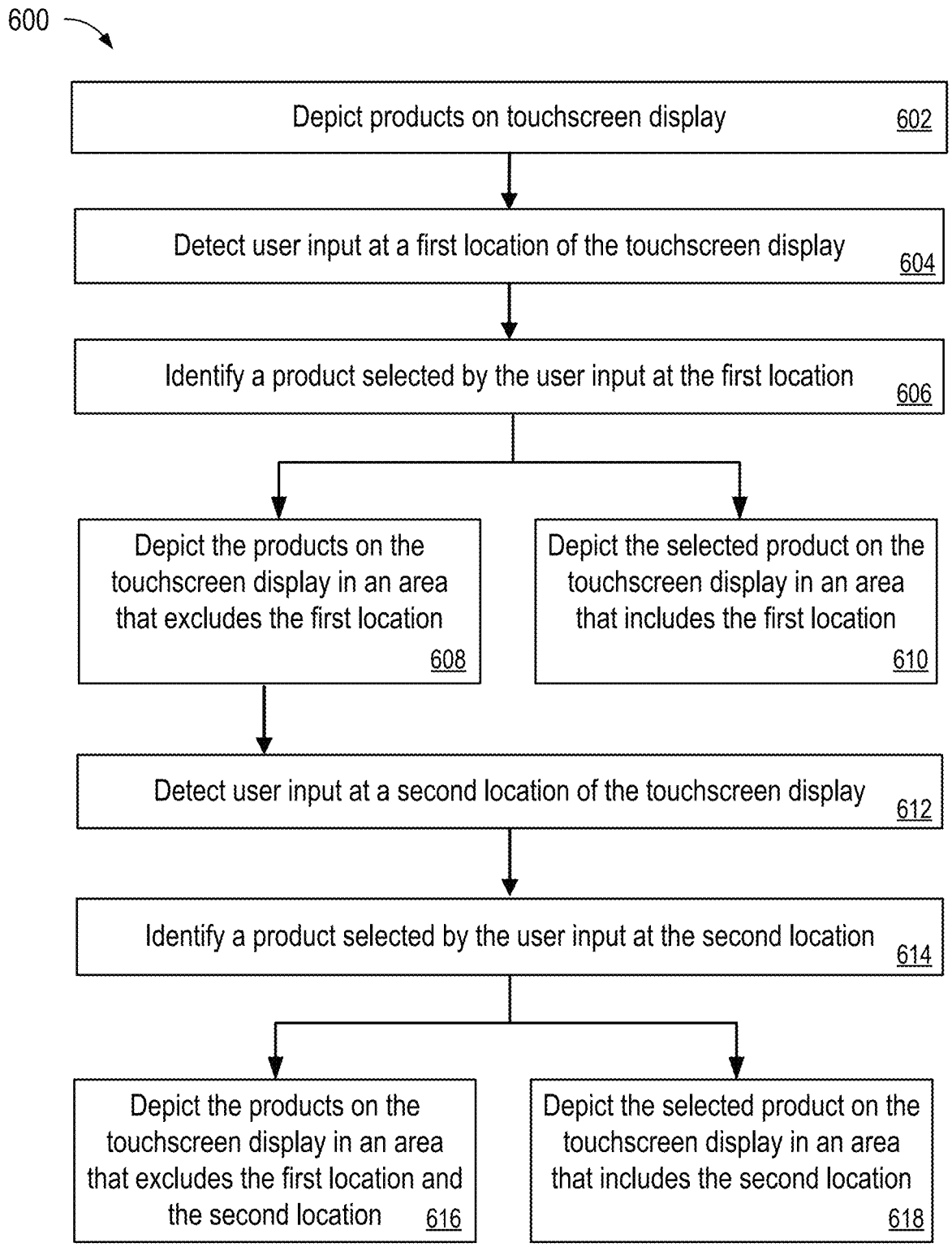
FIG. 6 shows a flow chart of an example process for dynamically adjusting planograms in response to receiving touch input according to implementations of the present disclosure.

FIG. 6 shows a flow chart of an example process 600 for dynamically adjusting planograms in response to receiving touch input. The process 600 includes depicting products on a touchscreen display (602). For example, referring to FIG. 5A, the display system 500 can provide image data for presentation by the display 510. The image data can depict products stored within the refrigerated display case. The image data can be presented as a planogram that represents the placement of products 501 within the refrigerated display case.

The process 600 includes detecting user input at a first location of the touchscreen display (604). For example, referring to FIG. 5A, the display system 500 can detect user input by a user's hand 502 touching a first location 504 of the display 510. The user input can include a selection of a product stored within the refrigerated display case. For example, a product can be selected by a user tapping on a depiction of the product, double-tapping on the depiction of the product, or interacting in another way with the depiction of the product on the touchscreen.

The process 600 includes identifying a product selected by the user input at the first location (606). For example, referring to FIG. 5A, the display system 500 can identify a product 505 selected by the user input at the first location 504. The display system 500 can identify the selected product, for example, by identifying a product or type of product displayed at the first location 504 when the touch input is received.

The process 600 includes depicting the products on the touchscreen display in an area that excludes the first location (608). For example, referring to FIG. 5B, the display system 500 can depict the products 501 in an area 508 of the display 510 that excludes the first location 504. In the example shown in FIG. 5B, the depiction of the products 501 is the same size as the depiction of the products 501 in FIG. 5A, such that some of the products 501 that are visible in FIG. 5A are not visible in FIG. 5B.

In some examples, the image data is adjusted such that the depiction of the products 501 is a different size and/or orientation when the display system 500 presents the information about the selected product 505, compared to when the display system 500 does not present the information about the selected product. For example, referring to FIG. 5C, the user selects product 505. In FIG. 5D, the information about the product 505 is shown in area 525 of the display 510. The planogram showing the positions of products in the display case is shown in area 528 of the display 510, with a reduced size compared to the planogram of FIG. 5C. Thus, by resizing the planogram, all of the products 501 may remain visible even when the display system 500 presents the information about the selected product 505.

The process 600 includes depicting the selected product on the touchscreen display in an area that includes the first location (610). For example, referring to FIG. 5B, the display system 500 can provide image data for presentation by the display 510 that depicts the selected product 505 in an area 506 of the display 510 that includes the first location 504. In some examples, the image data depicts information related to the selected product. For example, the image data can depict product details such as a name of the product, a price of the product, a flavor of the product, nutritional information about the product, or any combination of these. In some examples, the display 510 includes a holographic projector. The display system 500 can provide image data for presentation by the holographic projector. The image presented by the holographic projector can include an image of the selected product 505 including information about the selected product 505.

The process 600 includes detecting user input at a second location of the touchscreen display (612). For example, referring to FIG. 5E, the display system 500 can detect user input by a user's hand 512 touching a second location 514 of the display 510.

The process 600 includes identifying a product selected by the user input at the second location (614). For example, referring to FIG. 5E, the display system 500 can identify a product 515 selected by the user input at the second location 514. The display system 500 can identify the selected product, for example, by identifying a product or type of product displayed at the second location 514 when the touch input is received.

The process 600 includes depicting the products on the touchscreen display in an area that excludes the first location and the second location (616). For example, referring to FIG. 5F, the display system 500 can depict the products 501 in an area 518 that excludes the first location 504 and the second location 514.

The process 600 includes depicting the selected product on the touchscreen display in an area that includes the second location (618). For example, referring to FIG. 5F, the display system 500 can depict the selected product 515 in an area 516 that includes the second location 514.

The process 600 can be performed by a computing system including one or more computers, e.g., circuitry module 132. The order of steps in the process 600 is illustrative only, and the steps can be performed in different orders and/or in parallel. In some implementations, the process 600 can include additional steps, fewer steps, or some of the steps can be divided into multiple steps. In some examples, the steps of the process 600 can be performed by different components of the disclosed systems.

By dynamically adjusting planograms in response to receiving touch input, information about selected products can be presented to a customer interacting with the touchscreen while reducing impact to customer experience of other customers. For example, a customer can view information about a particular can of soda on part of the touchscreen, while other customers can view depictions of other beverages that are available inside the refrigerated display case.

Figure 7A:
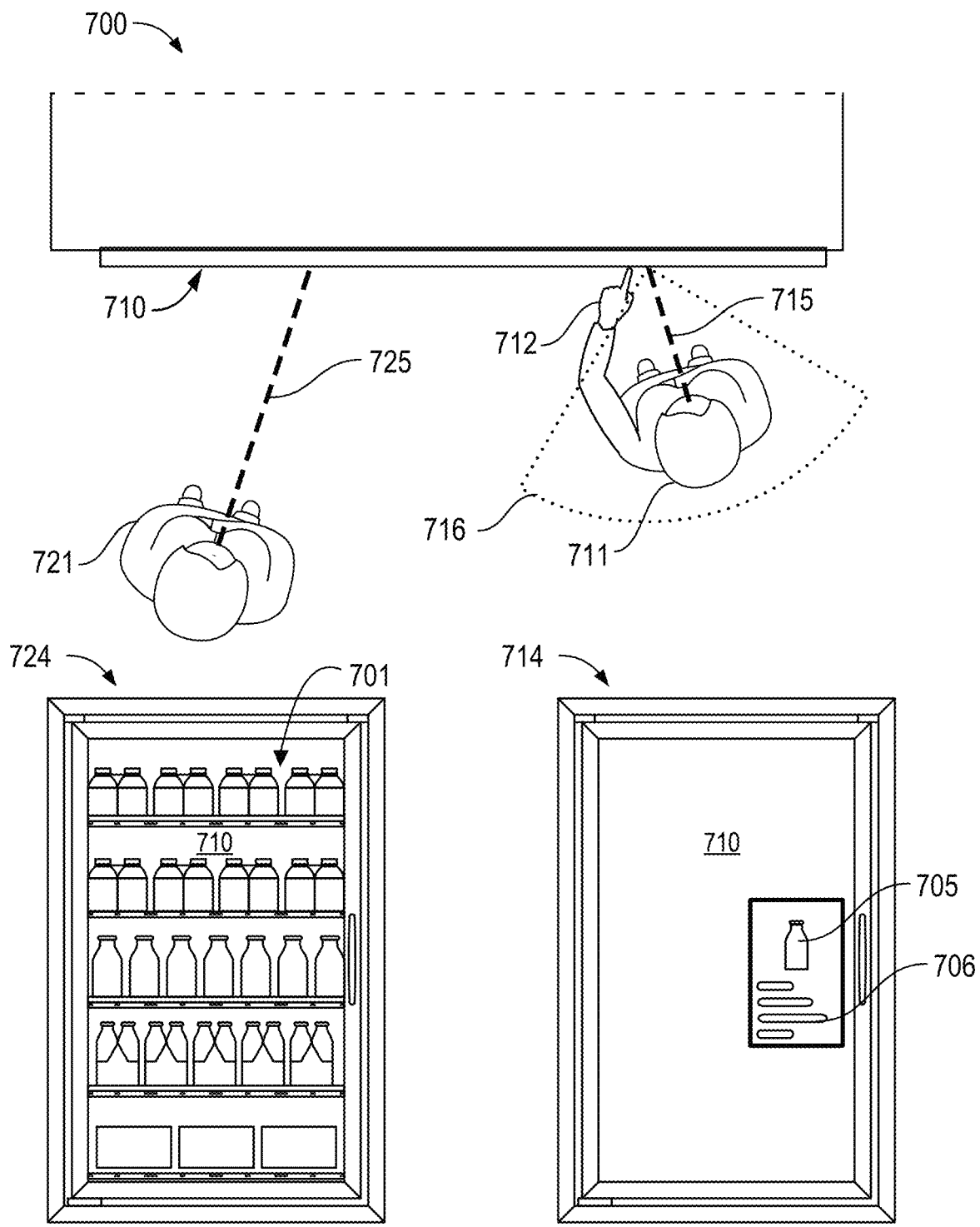
FIGS. 7A and 7B show an example display system presenting different images at different viewing angles according to implementations of the present disclosure.
Figure 7B:
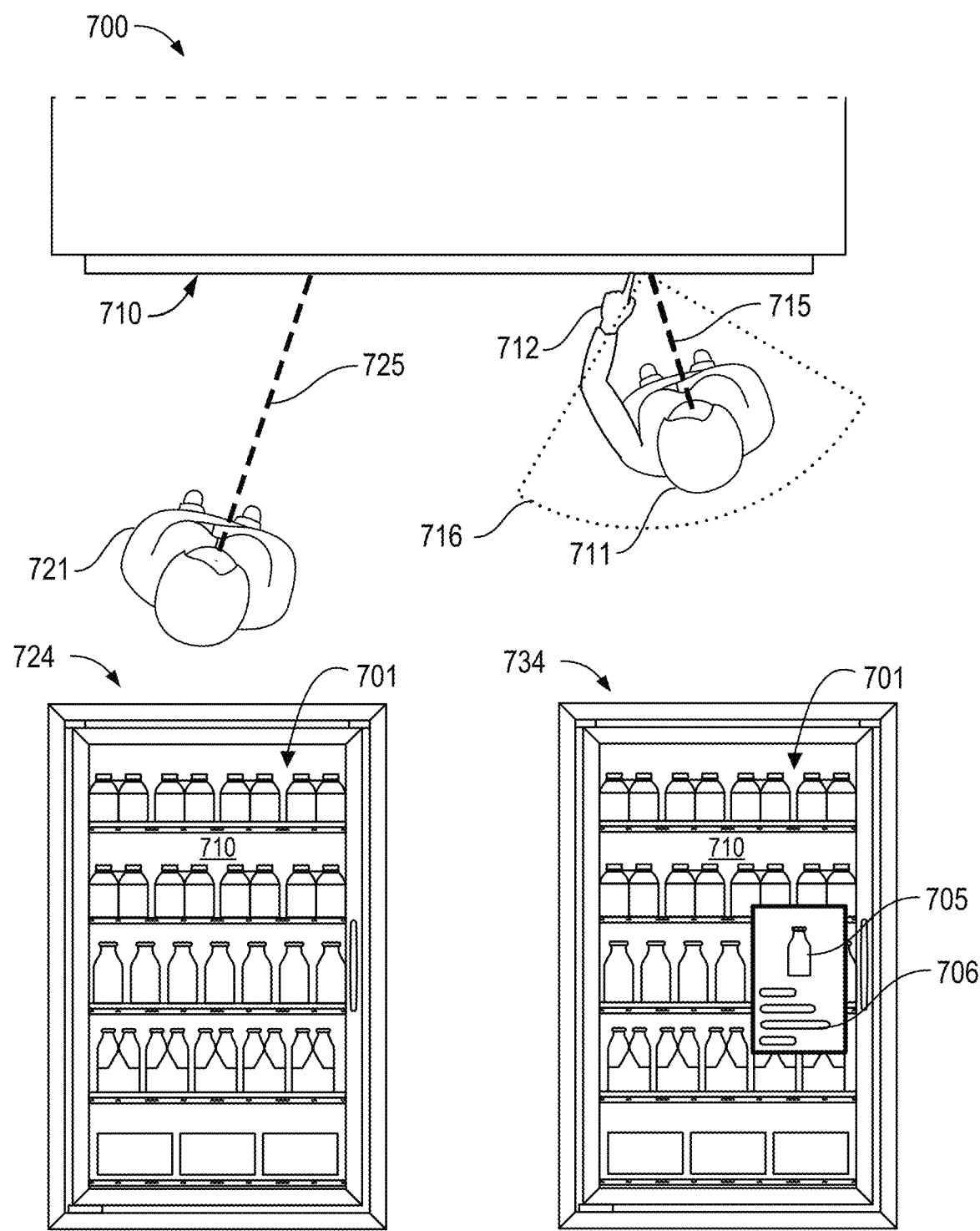

FIGS. 7A and 7B show an example display system 700 for a refrigerated display case presenting different images at different viewing angles. In general, the display system 700 presents a view 724 to the customer 721. The display system 700 presents a different view 714 to the customer 711. The display system 700 determines to present a particular view to a customer based on factors such as the customer's location relative to the display 710, eye tracking of the customer, and interactions of the customer with the display 710.

The display system 700 can include a processor or processors in electronic communication with a touchscreen display 710. In some examples, a data store is coupled to the processor. The data store can store instructions that, when executed by the processor, cause the processor to perform operations, such as the operations described with respect to the flow chart of FIG. 8.

In some examples, the touchscreen display is configured to present multiple different images at multiple different viewing angles. For example, the touchscreen display can be a stereoscopic display or an autostereoscopic display. In some examples, the touchscreen display includes an array of lenticular lenses, such that when viewed from slightly different angles, different parts of an image are shown. In some examples, the touchscreen display includes a polarizer such that the image appears different from different viewing perspectives.

In some examples, the display system 700 uses eye tracking techniques to track eye movement of a viewer and adjusts the image presented on the touchscreen display such that the viewer sees a particular image on the touchscreen display, while another viewer may view a different image. The display system 700 can include sensors that detect the location of a viewer and/or a location of the viewer's eye. The sensors can be, for example, the sensors 134, 136 as shown in FIG. 4. The sensors can include, for example, a visible light camera, an infrared camera, a radar sensor, an ultrasonic sensor, a motion sensor, or any combination of these.

Figure 8:
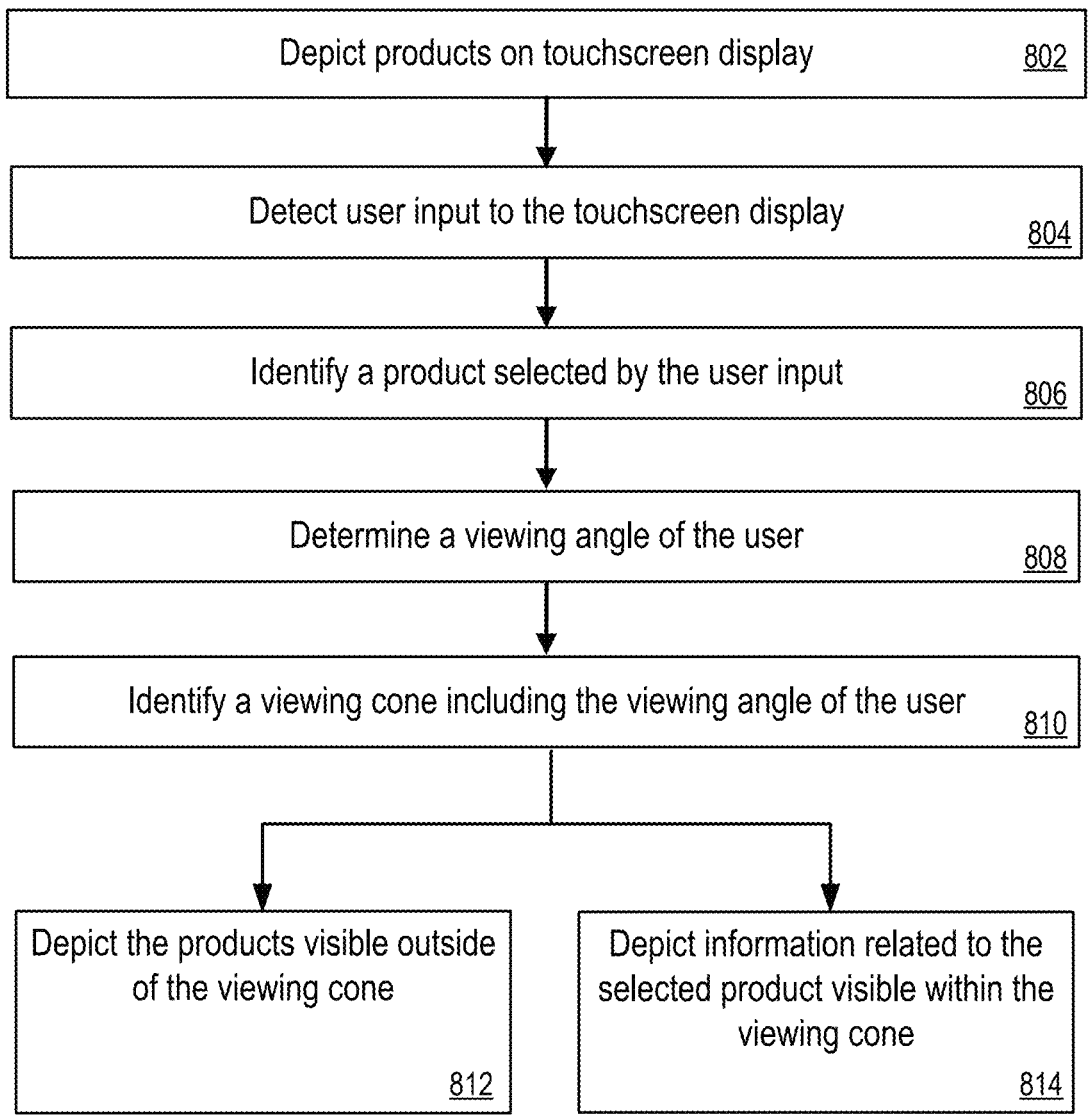
FIG. 8 shows a flow chart of an example process for presenting different images at different viewing angles according to implementations of the present disclosure.

FIG. 8 shows a flow chart of an example process 800 for presenting different images at different viewing angles. The process 800 includes depicting products on a touchscreen display (802). For example, referring to FIG. 7A, the display system 700 can provide image data for presentation by the display 710. The image data can depict products stored within the refrigerated display case. The image data can be presented as a planogram that represents the placement of products 701 within the refrigerated display case.

The process 800 includes detecting user input to the touchscreen display (804). For example, referring to FIG. 7A, the display system 700 can detect user input by a hand 712 of a customer 711 touching the display 710. The user input can include a selection of a product stored within the refrigerated display case.

The process 800 includes identifying a product selected by the user input (806). For example, referring to FIG. 7A, the display system 700 can identify a product 705 selected by the user input.

The process 800 includes determining a viewing angle of the user (808). For example, referring to FIG. 7A, the display system 700 can determine a viewing angle of the customer 711. In some examples, the viewing angle is an angle between the viewer's line of sight 715 and a plane of the display 710. In some examples, the viewing angle is an angle between the viewer's line of sight 715 and a perpendicular to the plane of the display 710.

In some examples, the display system 700 determines the viewing angle of the user based on the location of the touchscreen display at which the user input was detected. The display system 700 can store data that associates touch locations with predicted viewing angles. In some examples, the display system 700 determines the viewing angle of the user based on sensor data generated by a sensor. The sensor data can include, for example, visible light images or infrared images of the customer 711.

The process 800 includes identifying a viewing cone including the viewing angle of the user (810). A viewing cone can be a two-dimensional or three-dimensional range of angles that includes the viewing angle. For example, referring to FIG. 7A, viewing cone 716 includes the viewing angle of the line of sight 715 of the customer 711.

The process 800 includes depicting the products on the touchscreen display such that the products are visible outside of the viewing cone (812). For example, referring to FIG. 7A, customer 721 views the display 710 with line of sight 725. The viewing angle of line of sight 725 is different from the viewing angle of line of sight 715, and the line of sight 725 is not within the viewing cone 716 of the customer 711. The display system 700 depicts the products 701 on the display 710 such that the products 701 are visible outside of the viewing cone 716. Thus, to the customer 721, the display 710 shows all of the products 701 in the refrigerated display case as shown in view 724.

The process 800 includes depicting information related to the selected product on the touchscreen display such that the selected product is visible within the viewing cone (814). For example, referring to FIG. 7A, customer 711 views the display 710 with line of sight 715, inside viewing cone 716. The display system 700 depicts, within the viewing cone 716, the selected product 705 and information 706 related to the selected product 705. Thus, to the customer 711, the display 710 shows the selected product 705 and information 706, as shown in view 714. The selected product 705 and information 706 are not visible to the customer 721.

In some examples, as shown in FIG. 7A at view 714, the products 701 are not visible to the customer 711 after selection of the selected product 705. In some examples, the first image data is not visible at the viewing angle of the user.

In some examples, as shown in FIG. 7B, at view 734, the products 701 are visible to the customer 711 after selection of the selected product 705. For example, the image of the product 705 and information 706 can be overlaid on the image of the products 701 within the viewing cone 716.

The process 800 can be performed by a computing system including one or more computers, e.g., circuitry module 132. The order of steps in the process 800 is illustrative only, and the steps can be performed in different orders and/or in parallel. In some implementations, the process 800 can include additional steps, fewer steps, or some of the steps can be divided into multiple steps. In some examples, the steps of the process 800 can be performed by different components of the disclosed systems.

By dynamically adjusting planograms in response to receiving touch input, information about selected products can be presented to a customer interacting with the touchscreen while reducing impact to customer experience of other customers. For example, a customer viewing the display 710 from one angle can view information about a particular package of eggs, while other customers viewing the display 710 from different angles can view depictions of other packages of eggs that are available inside the refrigerated display case.

Figure 9:
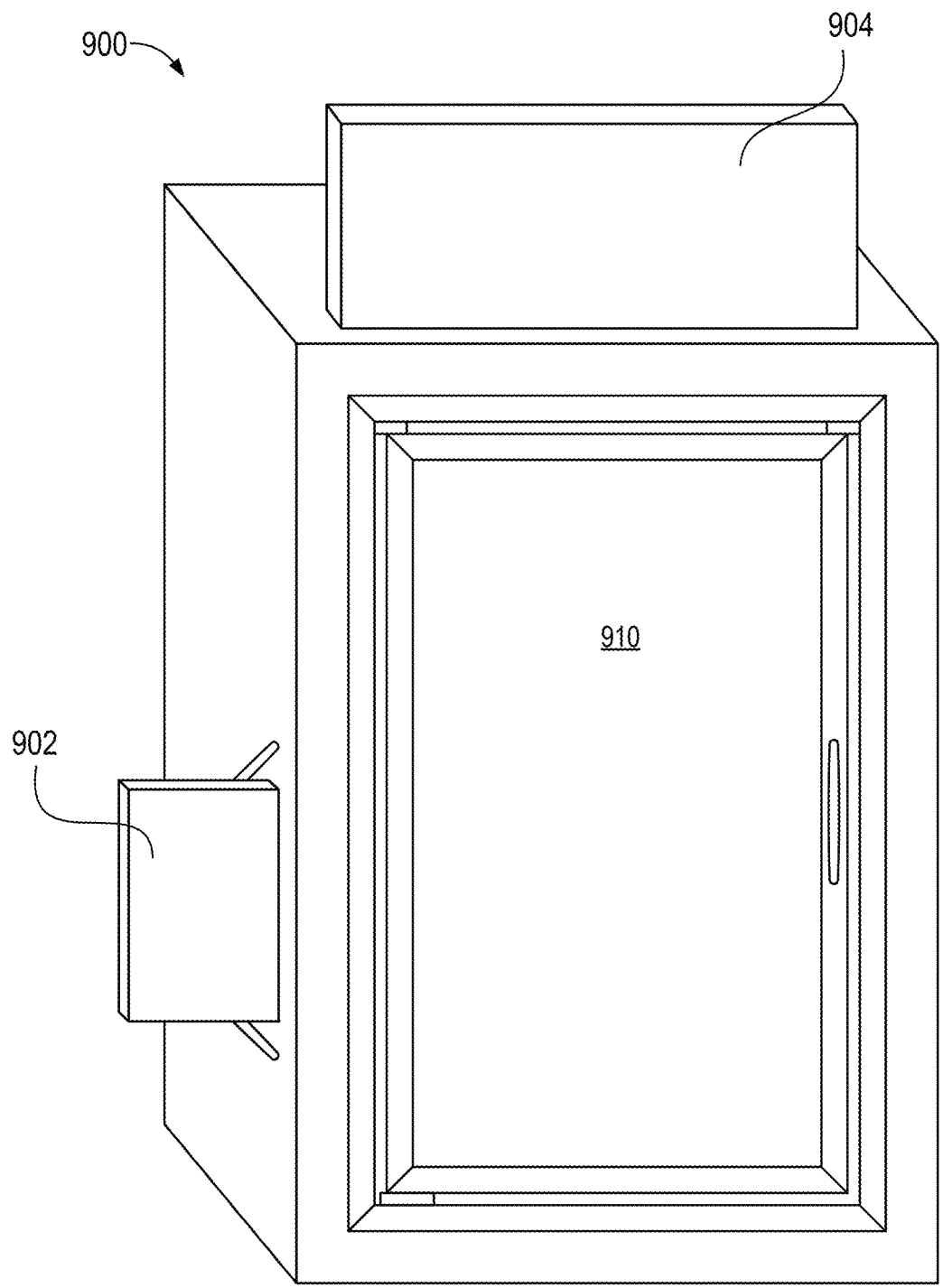
FIG. 9 shows an example an example display system including multiple display panels.

FIG. 9 shows an example an example display system 900 for a refrigerated display case including multiple display panels. The display system 900 can include a processor or processors in electronic communication with a touchscreen display 910. In some examples, a data store is coupled to the processor. The data store can store instructions that, when executed by the processor, cause the processor to perform operations, such as the operations described with respect to the flow chart of FIGS. 10A and 10B.

Figure 10A:
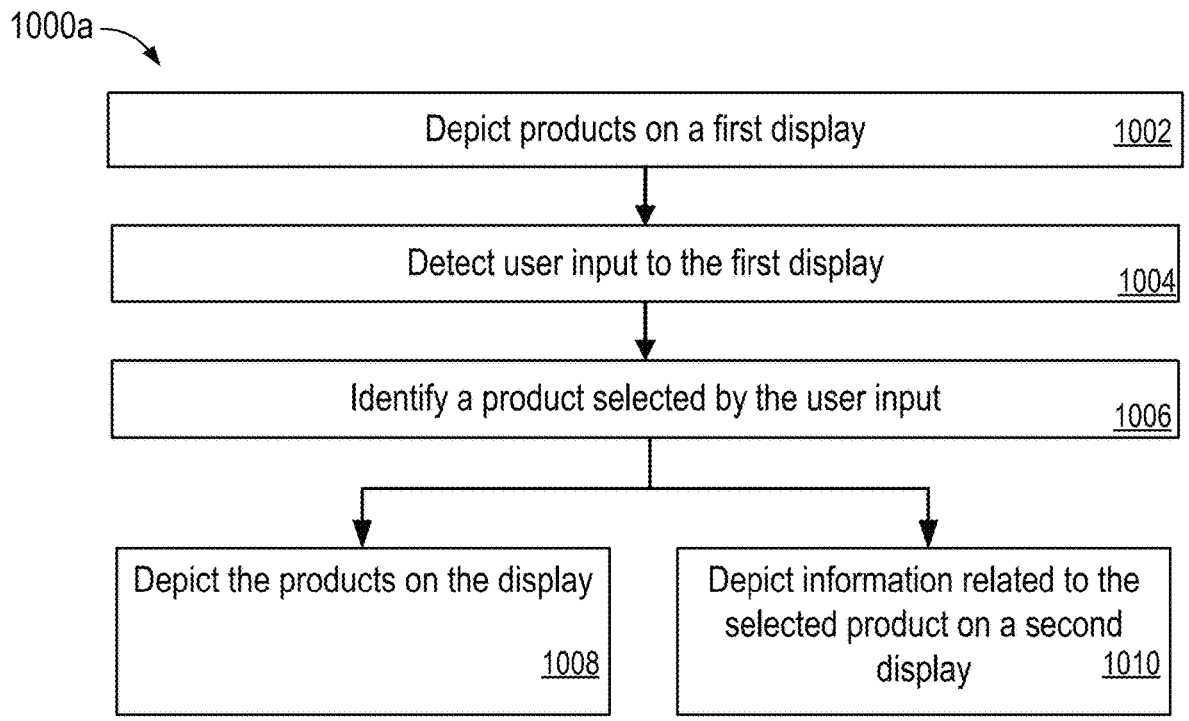
FIGS. 10A and 10B show flow charts of example processes for dynamically adjusting planograms on multiple display panels according to implementations of the present disclosure.
Figure 10B:
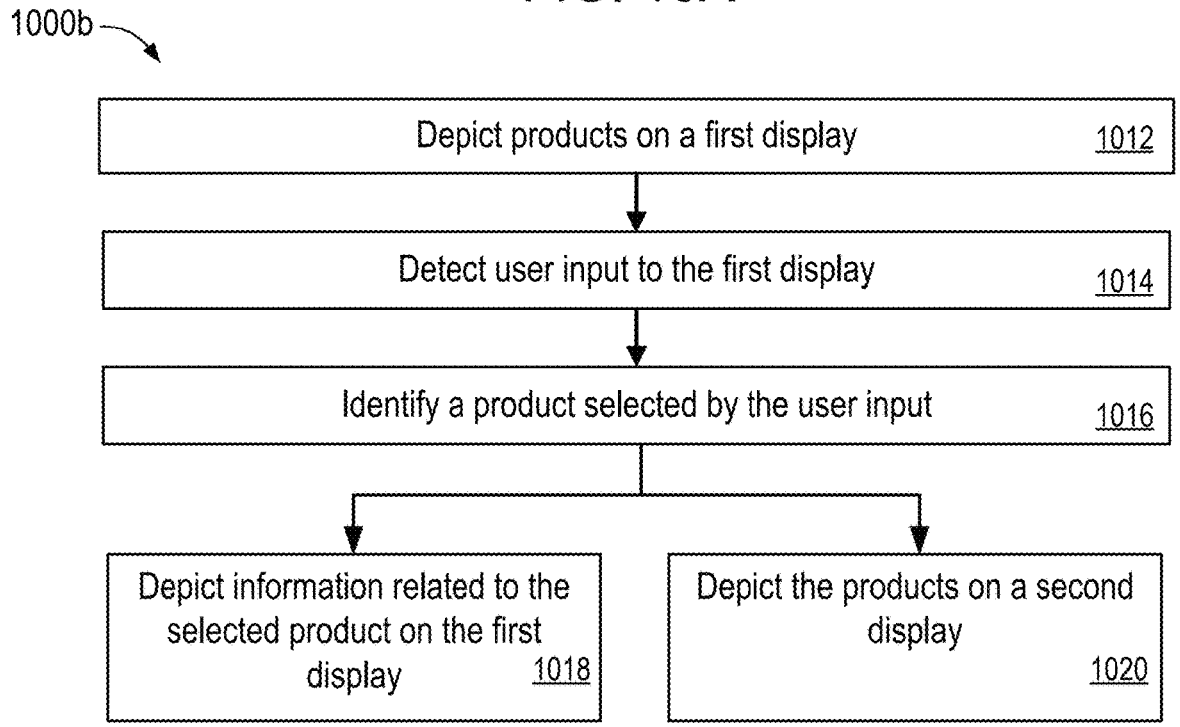

FIGS. 10A and 10B show flow charts of example processes 1000a, 1000b for dynamically adjusting planograms on multiple display panels.

Referring to FIG. 10A, the process 1000a includes depicting products on a first display (1002). For example, referring to FIG. 9, the display system 900 can provide image data for presentation by the display 910. The image data can depict products stored within the refrigerated display case. The image data can be presented as a planogram that represents the placement of products within the refrigerated display case.

The process 1000a includes detecting user input to the first display (1004). For example, referring to FIG. 9, the display system 900 can detect user input by a user touching the display 910. The user input can include a selection of a product stored within the refrigerated display case.

The process 1000a includes identifying a product selected by the user input (1006). For example, referring to FIG. 9, the display system 900 can identify a product selected by the user input.

The process 1000a includes depicting the products on the display (1008). For example, referring to FIG. 9, the display system 900 can continue to provide image data for presentation by the display 910 as a planogram that represents the placement of products within the refrigerated display case.

The process 1000a includes depicting information related to the selected product on a second display (1010). For example, referring to FIG. 9, the display system 900 can provide image data depicting information related to the selected product for presentation by a second, different display 902, 904. In some examples, the second display is a touchscreen display. In some examples, the second display is not a touchscreen display. In the example shown in FIG. 9, the display system 900 includes a display 902 positioned to the side of the display 910 and a display 904 positioned above the display 910. The displays 902, 904 can each be, for example, a tablet computer, a monitor, or a television.

The process 1000a can be performed by a computing system including one or more computers, e.g., circuitry module 132. The order of steps in the process 1000a is illustrative only, and the steps can be performed in different orders and/or in parallel. In some implementations, the process 1000a can include additional steps, fewer steps, or some of the steps can be divided into multiple steps. In some examples, the steps of the process 1000a can be performed by different components of the disclosed systems.

By dynamically adjusting planograms in response to receiving touch input, information about selected products can be presented to a customer interacting with the touchscreen while reducing impact to customer experience of other customers. For example, a customer can view information about a particular frozen dessert on the display 902, the display 904, or both, while other customers can view, on the display 910, depictions of other frozen desserts that are available inside the refrigerated display case.

Referring to FIG. 10B, the process 1000b includes depicting products on a first display (1012). For example, referring to FIG. 9, the display system 900 can provide image data for presentation by the display 910. The image data can depict products stored within the refrigerated display case. The image data can be presented as a planogram that represents the placement of products within the refrigerated display case.

The process 1000b includes detecting user input to the first display (1014). For example, referring to FIG. 9, the display system 900 can detect user input by a user touching the display 910. The user input can include a selection of a product stored within the refrigerated display case.

The process 1000b includes identifying a product selected by the user input (1016). For example, referring to FIG. 9, the display system 900 can identify a product selected by the user input.

The process 1000b includes depicting information related to the selected product on the first display (1018). For example, referring to FIG. 9, the display system 900 can provide image data depicting information related to the selected product on the display 910. The image data depicting information related to the selected product can be presented on the display 910 in addition to, or instead of, the depiction of the products stored within the refrigerated display case.

The process 1000b includes depicting the products on a second display (1020). For example, referring to FIG. 9, the display system 900 can provide image data depicting the products for presentation by a second, different display 902, 904.

The process 1000b can be performed by a computing system including one or more computers, e.g., circuitry module 132. The order of steps in the process 1000b is illustrative only, and the steps can be performed in different orders and/or in parallel. In some implementations, the process 1000b can include additional steps, fewer steps, or some of the steps can be divided into multiple steps. In some examples, the steps of the process 1000b can be performed by different components of the disclosed systems.

By dynamically adjusting planograms in response to receiving touch input, information about selected products can be presented to a customer interacting with the touchscreen while reducing impact to customer experience of other customers. For example, a customer can view information about a particular frozen dessert on the display 910, while other customers can view, on the display 902, 904, or both, depictions of other frozen desserts that are available inside the refrigerated display case.

Figure 11:
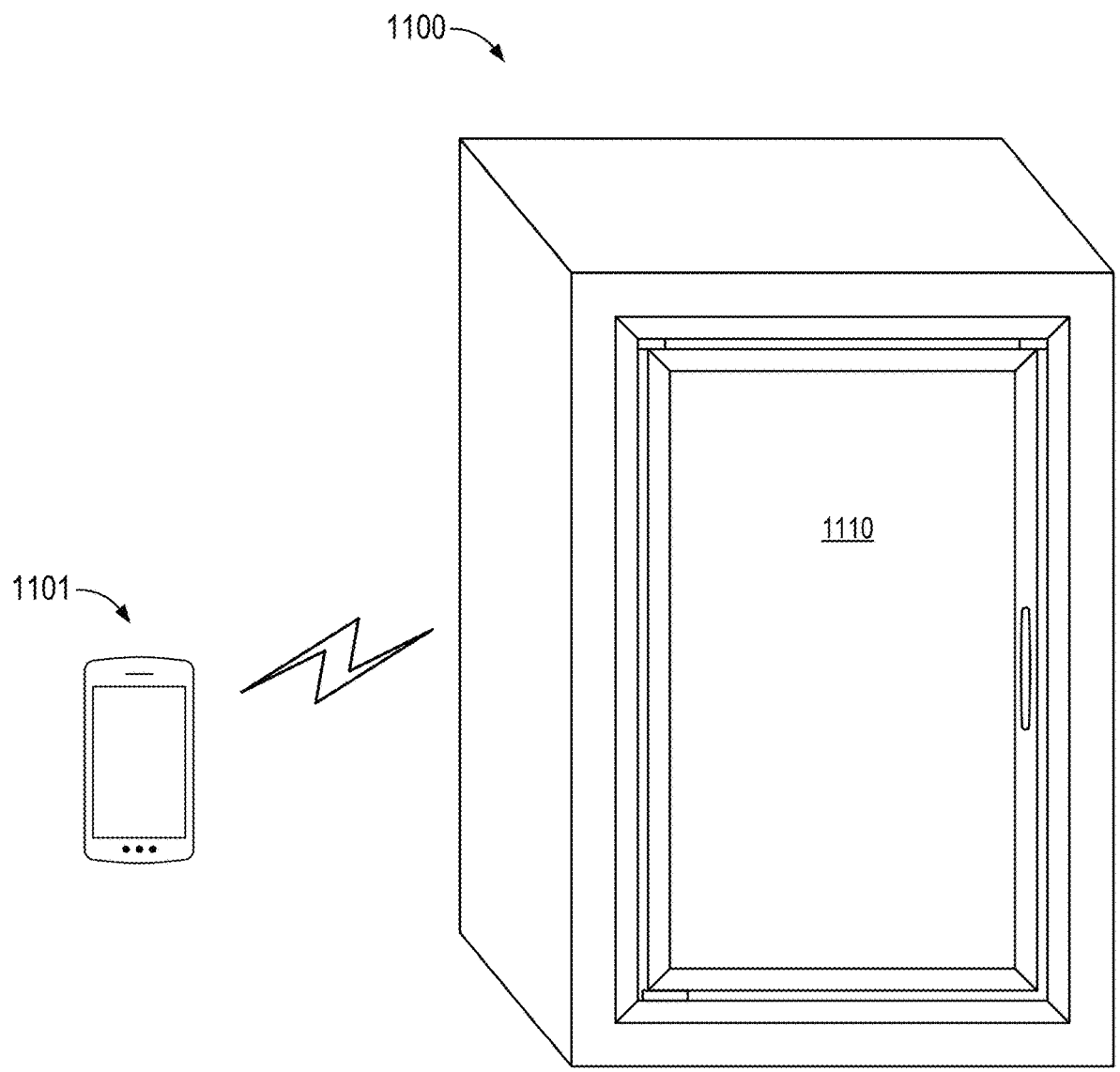
FIG. 11 shows an example display system communicating with a mobile display device.

FIG. 11 shows an example display system 1100 for a refrigerated display case communicating with a mobile display device 1101. The display system 1100 can include a processor or processors in electronic communication with a touchscreen display 1110. In some examples, a data store is coupled to the processor. The data store can store instructions that, when executed by the processor, cause the processor to perform operations, such as the operations described with respect to the flow chart of FIG. 12.

Figure 12:
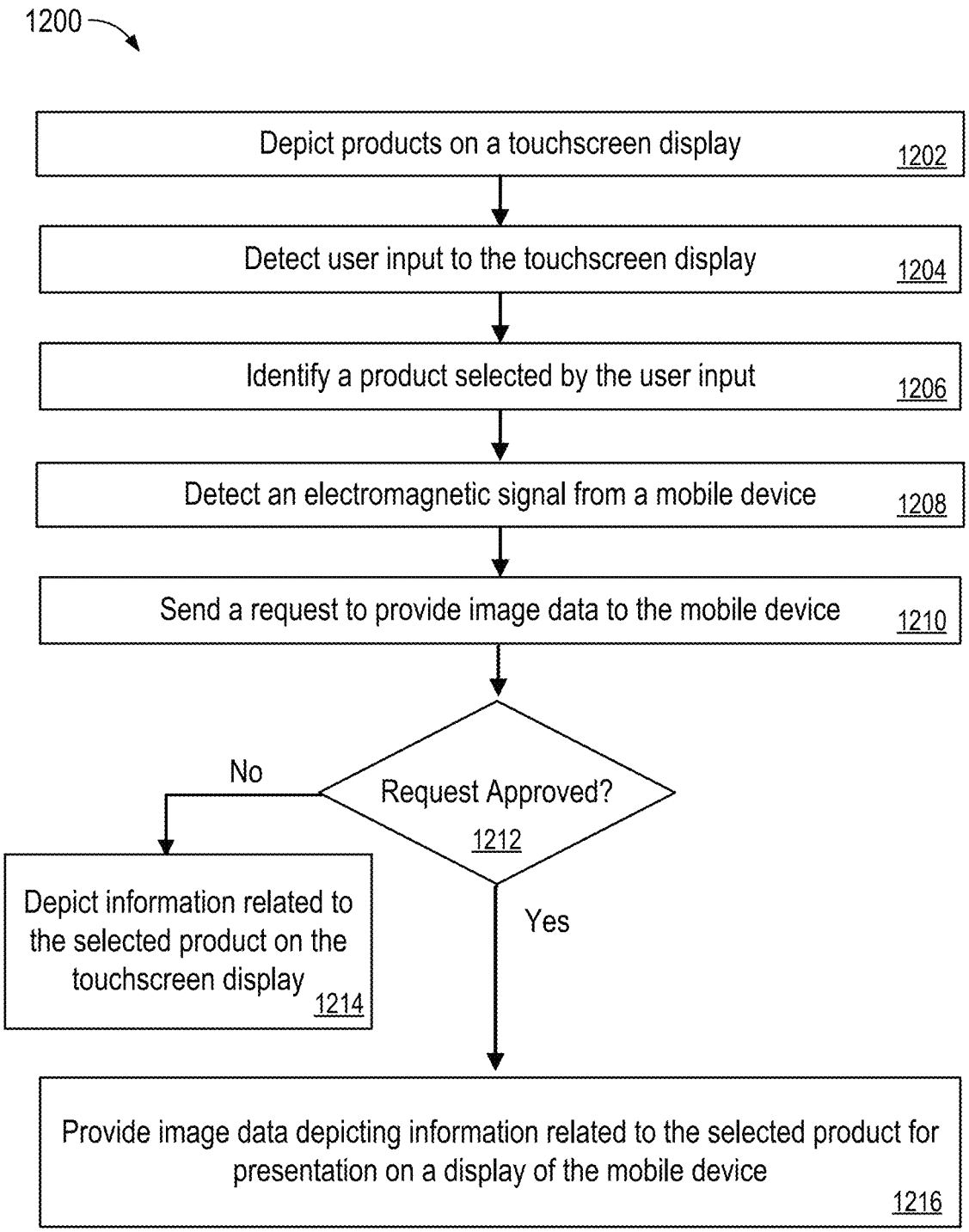
FIG. 12 shows a flow chart of an example process for a display system communicating with a mobile display device.

FIG. 12 shows a flow chart of an example process 1200 for a display system communicating with a mobile display device. The process 1200 includes depicting products on a touchscreen display (1202). For example, referring to FIG. 11, the display system 1100 can provide image data for presentation by the display 1110. The image data can depict products stored within the refrigerated display case. The image data can be presented as a planogram that represents the placement of products within the refrigerated display case.

The process 1200 includes detecting user input to the touchscreen display (1204). For example, referring to FIG. 11, the display system 1100 can detect user input by a user touching the display 1110. The user input can include a selection of a product stored within the refrigerated display case.

The process 1200 includes identifying a product selected by the user input (1206). For example, referring to FIG. 11, the display system 1100 can identify a product selected by the user input.

The process 1200 includes detecting an electromagnetic signal from a mobile device (1208). For example, referring to FIG. 11, the display system 1100 detects an electromagnetic signal from a mobile device 1101. The mobile device 1101 can be, for example, a phone, a tablet computer, a wearable device, a laptop computer, or another electronic device having an electronic display. The electromagnetic signal can be a short-range wireless communication signal, such as Bluetooth, Bluetooth LE, Z-wave, or Zigbee.

The process 1200 includes sending a request to provide image data to the mobile device (1210). For example, referring to FIG. 11, the display system 1100 can send a request to the mobile device 1101 to provide image data to the mobile device 1101.

The process 1200 includes determining whether the request is approved (1212). In some examples, the mobile device 1101 can be configured to automatically approve certain requests. For example, a user associated with the mobile device 1101 can "opt-in" to receiving image data from display systems at selected retail stores or store chains. The mobile device 1101 can then automatically approve a received request at the selected stores. In some examples, upon receiving the request from the display system 1100, the mobile device 1101 can present the request on a user interface. The mobile device 1101 can then receive, through the user interface, user input indicating approval or disapproval of the request.

The process 1200 includes, in response to determining that the request is not approved, depicting information related to the selected product on the touchscreen display (1214). For example, the mobile device 1101 can reject the request to provide image data to the mobile device 1101. The display system 1100 can then present the information related to the selected product on the touchscreen display 1110, as previously described with respect to FIGS. 5 to 8.

The process 1200 includes, in response to determining that the request is approved, providing image data depicting information related to the selected product for presentation on a display of the mobile device (1216). For example, referring to FIG. 11, the mobile device 1101 can approve the request to provide image data to the mobile device 1101, and the display system 1100 can provide the image data to the mobile device 1101. The mobile device 1101 can then present the information related to the selected product through a user interface. The display system 1100 can continue to provide image data for presentation by the display 1110 as a planogram that represents the placement of products within the refrigerated display case.

The process 1200 can be performed by a computing system including one or more computers, e.g., circuitry module 132. The order of steps in the process 1200 is illustrative only, and the steps can be performed in different orders and/or in parallel. In some implementations, the process 1200 can include additional steps, fewer steps, or some of the steps can be divided into multiple steps. In some examples, the steps of the process 1200 can be performed by different components of the disclosed systems.

By communicating product information to mobile devices, information about selected products can be presented to a customer interacting with the touchscreen while reducing impact to customer experience of other customers. For example, a customer can select a product on the touchscreen and then view the product information on their personal device. Another customer can then interact with the touchscreen and view product information on the touchscreen or on their personal device, without the customers interfering with each other.

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

While a number of examples have been described for illustration purposes, the foregoing description is not intended to limit the scope of the invention, which is defined by the scope of the appended claims. There are and will be other examples and modifications within the scope of the following claims. Furthermore, one of skill in the art would appreciate that features described in reference to a specific embodiment are not limited to that embodiment and can be interchanged with features of other embodiments.

What is claimed is:

1. A display system for a refrigerated display case, comprising:
   a movable door configured to provide access to the refrigerated display case;
   a touchscreen display mounted to the door, the touchscreen spanning a majority of a front surface of the door;
   at least one processor in electronic communication with the touchscreen display; and
   a data store coupled to the at least one processor having instructions stored thereon which, when executed by the at least one processor, causes the at least one processor to perform operations comprising:
      providing, for presentation by the touchscreen display, first image data, wherein the first image data depicts a planogram representing a respective location of one or more products stored within the refrigerated display case relative to the door;
      detecting user input at a first location of the touchscreen display, wherein the user input includes a selection of a product stored within the refrigerated display case;
      determining a location of the user relative to the touchscreen display; and
      in response to detecting the user input: providing second image data for presentation in addition to the first image data, wherein the second image data depicts information related to the selected product, and adjusting the presentation of the first image data representing the planogram based on the location of the user relative to the touchscreen display such that the user is not obstructing a view of the first image data by another user.

2. The display system of claim 1, the operations comprising:
   in response to detecting the user input:
      providing the second image data for presentation by the touchscreen display in a first area of the touchscreen display that includes the first location; and
      wherein adjusting the presentation of the first image data comprises providing the first image data for presentation by the touchscreen display in a second area of the touchscreen display that excludes the first location.

3. The display system of claim 2, wherein providing the first image data for presentation by the touchscreen display in the second area of the touchscreen display that excludes the first area comprises reducing a display size of the first image data.

4. A display system for a refrigerated display case, comprising:
   a movable door configured to provide access to the refrigerated display case;
   a touchscreen display mounted to the door;
   at least one processor in electronic communication with the touchscreen display; and
   a data store coupled to the at least one processor having instructions stored thereon which, when executed by the at least one processor, causes the at least one processor to perform operations comprising:
      providing, for presentation by the touchscreen display, first image data, wherein the first image data depicts one or more products stored within the refrigerated display case;
      detecting user input at a first location of the touchscreen display, wherein the user input includes a selection of a product stored within the refrigerated display case; and
      in response to detecting the user input, providing second image data for presentation in addition to the first image data, wherein the second image data depicts information related to the selected product, and wherein the second image data is provided for presentation by a second, different display in communication with the at least one processor.

5. A display system for a refrigerated display case, comprising:
   a movable door configured to provide access to the refrigerated display case;
   a touchscreen display mounted to the door;
   at least one processor in electronic communication with the touchscreen display; and
   a data store coupled to the at least one processor having instructions stored thereon which, when executed by the at least one processor, causes the at least one processor to perform operations comprising:
      providing, for presentation by the touchscreen display, first image data, wherein the first image data depicts one or more products stored within the refrigerated display case;
      detecting user input at a first location of the touchscreen display, wherein the user input includes a selection of a product stored within the refrigerated display case; and
      in response to detecting the user input providing second image data for presentation in addition to the first image data, wherein the second image data depicts information related to the selected product, and
   wherein the second image data is provided for presentation by the touchscreen display, and
   wherein the first image data is provided for presentation by a second, different display in communication with the at least one processor.

6. The display system of claim 1, wherein the touchscreen display includes a holographic projector, the operations comprising providing the second image data for presentation by the holographic projector.

7. The display system of claim 1, the operations comprising:
   detecting an electromagnetic signal from a mobile device; and
   in response to detecting the electromagnetic signal from the mobile device, providing the second image data for presentation by a display of the mobile device.

8. The display system of claim 1, wherein the touchscreen display comprises an autostereoscopic display configured to present multiple different images at respective multiple different viewing angles.

9. The display system of claim 8, the operations comprising:
in response to detecting the user input, determining a viewing angle of the user.

10. The display system of claim 9, the operations comprising:
providing the second image data for presentation by the touchscreen display, wherein the second image data is visible at the viewing angle of the user; and
providing the first image data for presentation by the touchscreen display, wherein the first image data is not visible at the viewing angle of the user.

11. The display system of claim 9, the operations comprising:
providing the second image data for presentation by the touchscreen display, wherein:
the second image data is visible within a cone of viewing angles relative to the touchscreen display, the cone of viewing angles including the viewing angle of the user; and
the second image data is not visible outside of the cone of viewing angles.

12. The display system of claim 9, the operations comprising:
determining the viewing angle of the user based on the first location of the touchscreen display at which the user input was detected.

13. The display system of claim 9, comprising a sensor configured to generate sensor data indicating a user location, the operations comprising:
obtaining sensor data generated by the sensor; and
determining the viewing angle of the user based on the sensor data.

14. The display system of claim 13, wherein the sensor comprises at least one of a camera, an infrared sensor, a radar sensor, an ultrasonic sensor, and a motion sensor.

15. The display system of claim 1, the operations comprising:
detecting a second user input at a second location of the touchscreen display, wherein the second user input includes a selection of a second product stored within the refrigerated display case; and
in response to detecting the second user input, providing third image data for presentation in addition to the first image data and the second image data, wherein the third image data depicts information related to the second product.

16. The display system of claim 15, the operations comprising:
in response to detecting the second user input:
providing the third image data for presentation by the touchscreen display in a second area of the touchscreen display that includes the second location; and
providing the first image data for presentation by the touchscreen display in a third area of the touchscreen display that excludes the first location and the second location.

17. The display system of claim 1, wherein:
an internal volume of the refrigerated display case holds an inventory including the one or more products; and
the first image data includes a planogram representing the inventory.

18. The display system of claim 1, wherein the movable door comprises an insulated panel.

19. The display system of claim 1, comprising a second display separate from the door and mounted next to the door, the second display in communication with the at least one processor, and wherein the operations comprise, in response to detecting the user input:
providing the second image data for presentation by the touchscreen display; and
providing the first image data for presentation by the second display.

20. The display system of claim 19, wherein the second display is mounted above the door.

21. The display system of claim 5, wherein the second display is separate from the door and mounted next to the door.

* * * * *